United States Patent [19]

Irie et al.

[11] Patent Number: 5,847,658
[45] Date of Patent: Dec. 8, 1998

[54] VIBRATION MONITOR AND MONITORING METHOD

[75] Inventors: Atsushi Irie, Tsukuba; Kiyotoshi Okura, Tsuchiura; Atsushi Osada, Mitsukaido; Yoshiyuki Morita, Tsukuba; Hidenobu Umeda, Ushiku; Yukio Ogawa, Kyotanabe; Koichi Furusawa, Tsukuba; Naoki Fujimoto, Nagaokakyo, all of Japan

[73] Assignee: Omron Corporation, Kyoto, Japan

[21] Appl. No.: 689,787

[22] Filed: Aug. 13, 1996

[30] Foreign Application Priority Data

Aug. 15, 1995 [JP] Japan ................................. 7-228615

[51] Int. Cl.⁶ ................................................ G08B 21/00
[52] U.S. Cl. .............. 340/683; 364/551.01; 364/551.02; 73/579; 73/612; 73/659; 73/660
[58] Field of Search ..................... 340/683, 679, 340/635, 680; 364/550, 551.01, 551.02, 508, 474.19, 494; 73/570, 572, 579, 593, 602, 660, 659, 658

[56] References Cited

U.S. PATENT DOCUMENTS

| 4,060,716 | 11/1977 | Pekrul et al. ............................. 364/576 |
| 4,302,813 | 11/1981 | Kurihara et al. ......................... 364/508 |
| 4,426,641 | 1/1984 | Kurihara et al. ......................... 340/683 |
| 4,514,797 | 4/1985 | Begin ...................................... 364/148 |
| 4,614,117 | 9/1986 | Taniguti ................................... 73/659 |
| 4,683,542 | 7/1987 | Taniguti ................................... 364/508 |
| 4,980,844 | 12/1990 | Demjanenko et al. .................. 364/550 |
| 5,251,151 | 10/1993 | Demjanenko et al .................. 364/550 |
| 5,333,240 | 7/1994 | Matsumoto et al. ...................... 395/23 |
| 5,488,872 | 2/1996 | McCornick ........................... 73/862.68 |
| 5,521,840 | 5/1996 | Bednar .................................... 364/508 |
| 5,587,931 | 12/1996 | Jones et al. ........................ 364/551.02 |
| 5,602,757 | 2/1997 | Haseley et al. .......................... 364/550 |
| 5,610,339 | 3/1997 | Haseley et al. .......................... 364/508 |
| 5,629,870 | 5/1997 | Farag et al. ........................ 364/551.01 |
| 5,710,723 | 1/1998 | Hoth et al. .......................... 364/551.01 |

Primary Examiner—Nina Tong
Attorney, Agent, or Firm—Dickstein Shapiro Morin & Oshinsky, LLP

[57] ABSTRACT

The object of this invention is to produce a monitor which can correctly distinguish normal from abnormal vibration using automatically selected monitoring features and algorithms. The monitor can be used with a variety of devices with different vibration characteristics. The monitor according to this invention has a sensor that detects the vibration of an object. The monitor is operated in learning mode when the object is vibrating normally. The waveform of the vibration detected by this sensor is sampled over an appropriate period and analyzed. The data for each sampling feature are subjected to statistical processing, and the data which evince slight change are extracted as monitoring features. A monitoring algorithm is automatically made for these monitoring features. The algorithm selected in learning mode are used to evaluate the vibration of an object when the monitor is in operating mode. The operator does not need to set up the algorithm, and can monitor the object with a more reliable algorithm than the conventional one selected by fixed monitoring features.

28 Claims, 19 Drawing Sheets

| FEATURE 1 | FEATURE 2 | DURING NORMAL VIBRATION |
|---|---|---|
| S | S | SS |
| S | M | SS |
| S | B | S |
| M | S | S |
| M | M | ZR |
| M | B | B |
| B | S | B |
| B | M | BB |
| B | B | BB |

VIBRATION MONITOR AND MONITORING METHOD

FIELD OF THE INVENTION

This invention concerns a vibration monitor and vibration monitoring method which discriminate normal from abnormal vibration of a motor, hydraulic cylinder, or other device by analyzing with a computer the output of a vibration sensor attached to that device. More specifically, it concerns a general-use vibration monitor and monitoring method which can be used in a variety of devices.

BACKGROUND OF THE INVENTION

The following type of vibration monitor is available, as described in Japanese Kokai Kohou (Patent Publication Heisei 5-340799). This device uses a sensor to detect the vibration of any of a variety of devices which may be monitored. The sensor output is analyzed by a data processing device such as a computer, and the monitor discriminates normal from abnormal vibration of the device in the following way.

First, the aforesaid data processing device is operated in learning mode while the device to be monitored is vibrating normally. In this mode, the waveform of the vibration detected by the aforesaid sensor is sampled over a specified period, and the waveform is analyzed for a number of monitoring features which were determined beforehand. The data associated with each monitoring feature are subjected to statistical processing. Based on the result of this processing (that is to say, on the characteristics of the waveform representing normal vibration), an algorithm is determined to monitor whether the vibration is normal or abnormal.

The aforesaid monitoring features include the frequency of the waveform, the amplitude, maximum value, minimum value, peak-to-peak amplitude value, number of times the high-level threshold value is exceeded, number of times the low-level threshold value is exceeded, period during which the high-level threshold value is exceeded, period during which the low-level threshold value is exceeded and number of times the local minimum (number of peaks) is generated. All are features which are well suited to extracting the characteristics of the waveform of the vibration.

The waveform of the vibration detected by the aforesaid sensor is then sampled over a specified period in actual operating mode. Just as in learning mode, the waveform is analyzed for the various monitoring features, and the data associated with each monitoring feature are processed according to the aforesaid algorithm. A determination is then made as to whether the vibration of the device is normal or abnormal.

The aforesaid prior art device automatically generates an algorithm to determine whether the vibration is normal or abnormal based on the waveform representing the normal vibration of the device which was input in learning mode. When the user applies the vibration monitor to a specific device, the characteristics of normal and abnormal vibration of that device are analyzed, and no cumbersome preparation is needed to choose an appropriate determination algorithm based on the results of the analysis. In other words, the user need only mount the vibration sensor on the device to be monitored and operate the monitor in learning mode. Thereafter normal and abnormal vibration will be determined correctly in actual operating mode.

With prior art monitors, however, the selection of which features are to be analyzed by processing the waveform obtained by the sensor in learning and operating modes is pre-determined when the monitor is designed. A monitor which can successfully evaluate vibration when applied to a device such as a motor will be, therefore, less reliable when applied to a device such as a hydraulic cylinder. The suitability of the monitor, then, will vary with the application. Appropriate monitoring features must be chosen for the devices to be monitored, and the process of determining which monitoring features are appropriate is complicated and difficult. If the wrong monitoring features are selected, erroneous judgments may result.

SUMMARY OF THE INVENTION

The objective of this invention is to solve the problem outlined above and to provide a vibration monitor which would be able to correctly discriminate normal and abnormal vibration using appropriate monitoring features and an appropriate algorithm, both of which would be set automatically, when the monitor is applied to various devices or machines with different vibration characteristics.

In order to accomplish the objective outlined above, the vibration monitor of this invention is basically designed as described in (1) through (3) below.

(1) The vibration produced by the vibration system which is being monitored is detected by a sensor. A data processing device is employed to analyze the output of the sensor and determine whether the vibration produced by the system being monitored is normal or abnormal.

(2) When the system being monitored is vibrating normally, the aforesaid data processing device is set in learning mode. In this mode, the vibration waveform from the aforesaid sensor is sampled over a given period, and this waveform is analyzed for numerous monitoring items which were determined beforehand. The uniqueness of this invention is that the data associated with each monitoring items are subjected to statistical processing, and some predetermined number of the statistical data associated with the monitoring items are automatically selected which are recognized as a statistically stable data. The items which correspond to these data are chosen as the monitoring items to be monitored in operating mode. An algorithm is generated to determine whether the vibration is normal or abnormal based on the data associated with the monitoring items which have been chosen.

(3) When the aforesaid learning mode operations have been concluded, the aforesaid data processing device is operated in operating mode. In this mode, the vibration waveform from the aforesaid sensor is sampled as required and analyzed for the monitoring items determined in the aforesaid learning mode. The data chosen for analysis are processed according to the aforesaid algorithm which was generated in the aforesaid learning mode, and a determination is made as to whether the vibration is normal or abnormal.

In other words, according to this invention, the waveform representing normal vibration which is input in learning mode is analyzed for a variety of sampling features. The monitoring features which will be actually used in operating mode are selected automatically out of the sampling features according to the results of the analysis. The question of which features will most readily yield a distinction between normal and abnormal vibration of the device to be monitored is decided in the learning mode so that only a limited number of monitoring features which are selected from the sampling features will be analyzed in the operating mode.

DETAILED DESCRIPTION OF THE INVENTION

Figure 1:
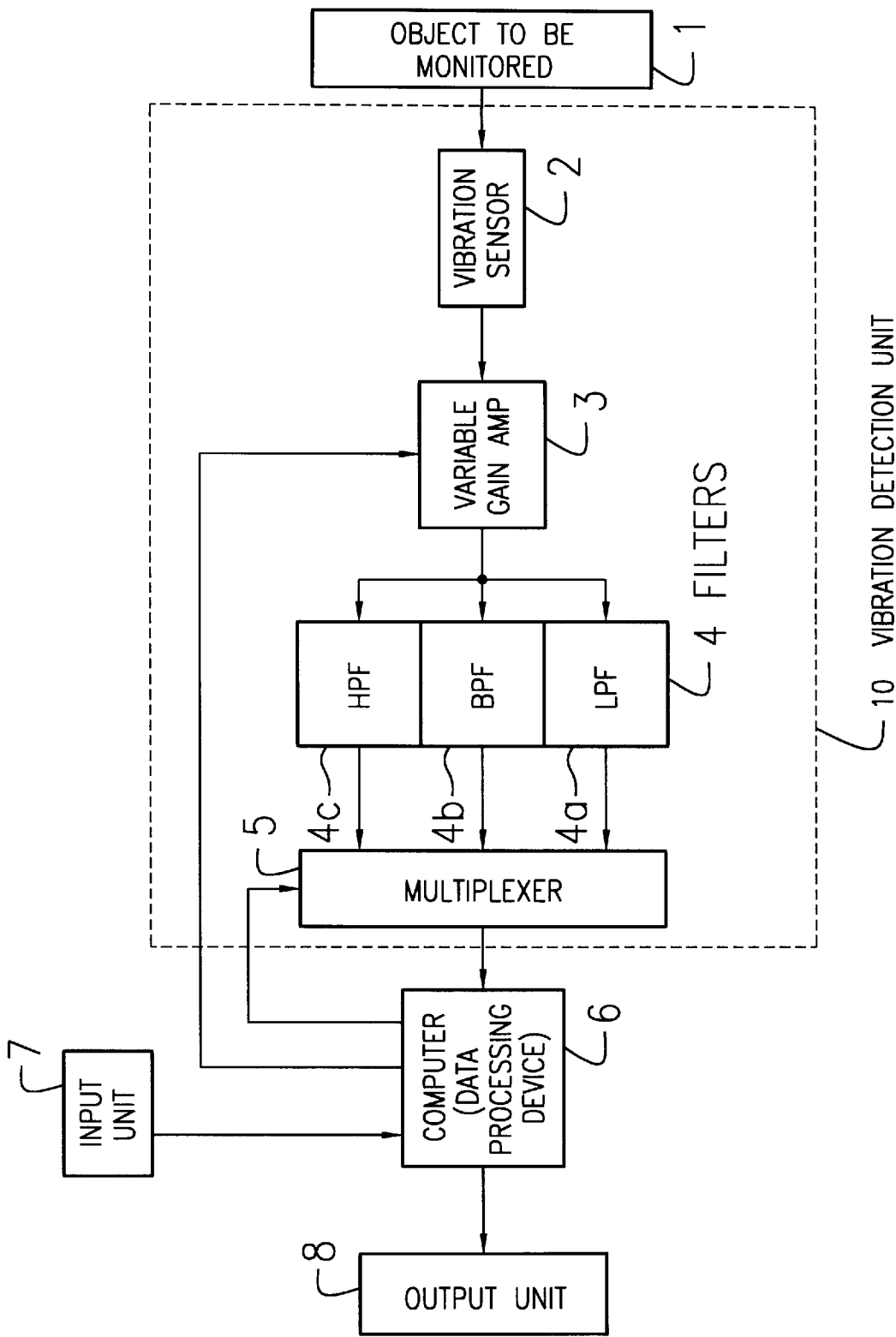
FIG. 1 is a block diagram of a vibration monitor which is an ideal embodiment of this intention.

As can be seen in FIG. 1, a vibration sensor 2 is attached to device 1 to be monitored. The output of this sensor, is input into computer 6 by way of variable gain amp 3, three filters (LPF 4a, BPF 4b and HPF 4c) and multiplexer 5. In its initial processing for learning mode, which will be discussed at a later point, computer 6 adjusts the gain of variable gain amp 3. The computer also samples the sensor output which has been passed through the three filters (LPF 4a, BPF 4b and HPF 4c) while switching multiplexer 5 at high speed, digitizes it and analyzes it as follows.

Computer 6 may be an ordinary one-chip microcomputer or a DSP (digital signal processor). The computer has an input unit 7 such as a keyboard and an output unit 8, which may be a display such as a liquid crystal panel or a CRT or a printer. Computer 6 executes the data processing which is essential to the vibration monitor of this invention. This processing constitutes the bulk of the activity in both the aforesaid learning and operating modes. An outline of the processing in both modes is provided by the flowcharts in FIGS. 2 and 3.

Figure 2:
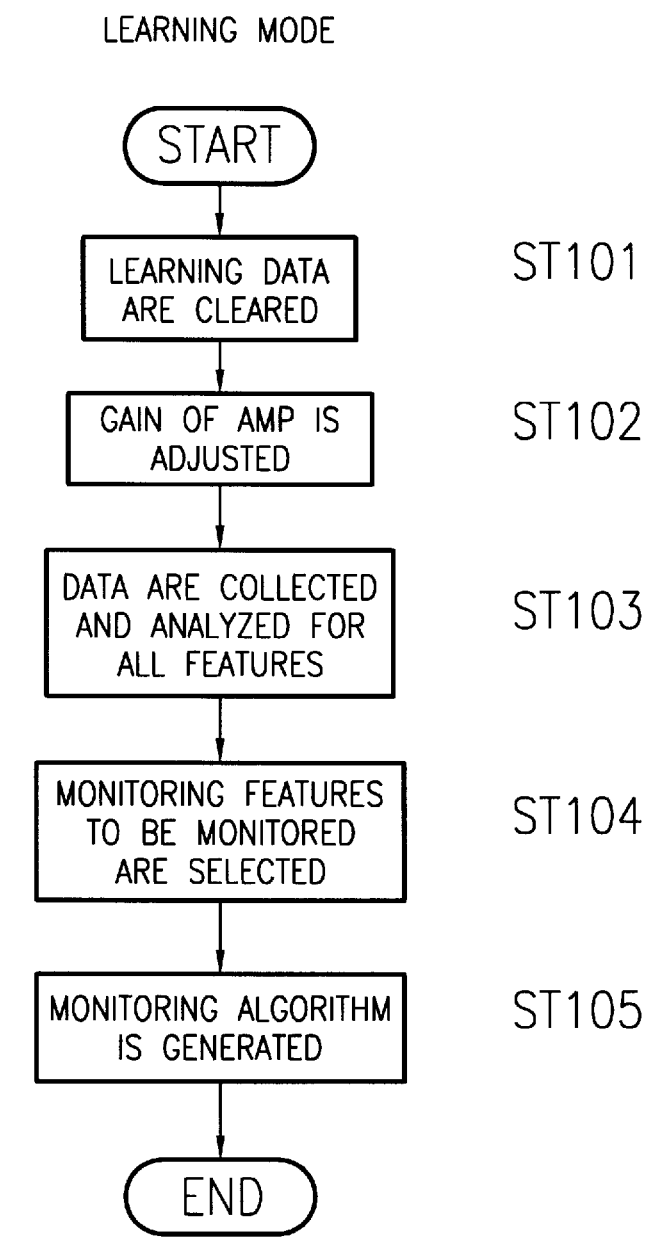
FIG. 2 is a flowchart of the processing executed in learning mode.

When computer 6 receives via input unit 7 a command to implement learning mode, the processing shown in FIG. 2 is begun. At this time device 1, the device to be monitored, is made to vibrate normally, and vibration sensor 2 detects the waveform representing normal vibration. All learning data collected previously are cleared (Step 101). Next, the gain of variable-gain amp 3 is adjusted appropriately (Step 102). The output of sensor 2 is read after passing through filters 4 and multiplexer 5. The gain of amp 3 is adjusted so as to confine the input level of the sensor (the output level of amp 3) within a previously determined appropriate range.

In Step 103, the output of vibration sensor 2 (the waveform representing the normal vibration of device 1) is sampled at high speed by way of amp 3, filters 4 and multiplexer 5, and the data are analyzed as follows.

In the data collection and processing executed in Step 103 in this embodiment, the output of sensor 2 is sampled over an appropriate period, and the data representing the sampled waveform are analyzed with respect to sampling features (1) through (8) as follows.

(1) Maximum value (2) Minimum value (3) Peak-to-peak value (from maximum value to maximum value)

(4) Number of times a given high-level threshold value is exceeded (5) Number of times a given low-level threshold value is exceeded (6) Time period during which a given high-level threshold value is exceeded (7) Time period during which a given low-level threshold value is exceeded (8) Number of times the local minimum is generated (corresponds to the number of peaks)

Since filters 4a, 4b and 4c have different pass bands and the output of each filter is analyzed for the aforesaid eight sampling features, there are a total of 8×3 or 24 sampling features which are considered.

The analysis of these twenty-four sampling features is repeated, for example, one hundred times. The data for each analysis are statistically processed, and the standard deviation of the data is obtained after each one hundred instances. To give one example, sampling feature (1), the maximum value of the output of filter 4a, would be obtained for one hundred sampling periods, and the standard deviation value of the data representing the one hundred maximum values would be calculated.

In this way the standard deviation value of the data is obtained for all twenty-four sampling features. The data representing the standard deviation values for the twenty-four sampling features are arranged in order of ascending value and three data are picked up in order starting with the smallest value. Let us call the smallest standard deviation value x (we shall call its sampling feature $K_x$), the second smallest standard deviation value y (we shall call its sampling feature $K_y$) and the third smallest standard deviation value z (we shall call its sampling feature $K_z$). Although in this case we have selected the three smallest standard deviation values, the number need not be limited to three; any desired number of values might be used. In addition, instead of selecting a predetermined number of deviation values, we might select, for example, all sampling features with a standard deviation value below a reference value. Various types of selection standards may be employed. Regardless of what scheme is used, the sampling features chosen for analysis should be ones whose values do not vary in the normal state (and which do vary in the abnormal state).

In Step 104, the aforesaid three sampling features $K_x$, $K_y$ and $K_z$ are selected from the twenty-four sampling features as the monitoring features to be monitored in operating mode. In Step 105, an algorithm to distinguish normal from abnormal vibration is generated based on the data associated with monitoring features $K_x$, $K_y$ and $K_z$.

The upper and lower limits are established for the normal range for each monitoring feature. During the actual monitoring (i.e., in operating mode), the judgment as to whether the vibration is abnormal is made by determining whether the value for the monitoring feature which is extracted is within the established range. The normal range might, for example, be determined based on the variance of the monitoring feature value. If $\sigma$ is the deviation and $3\sigma$ is the variance, the normal range would be set at the average value $\pm 3\sigma$. The average value plus $3\sigma$ would be the upper limit of the range, and the average value minus $3\sigma$ would be its lower limit. The upper limit could also be set at "maximum value plus $3\sigma$" and the lower limit at "maximum value minus $3\sigma$".

Figure 3:
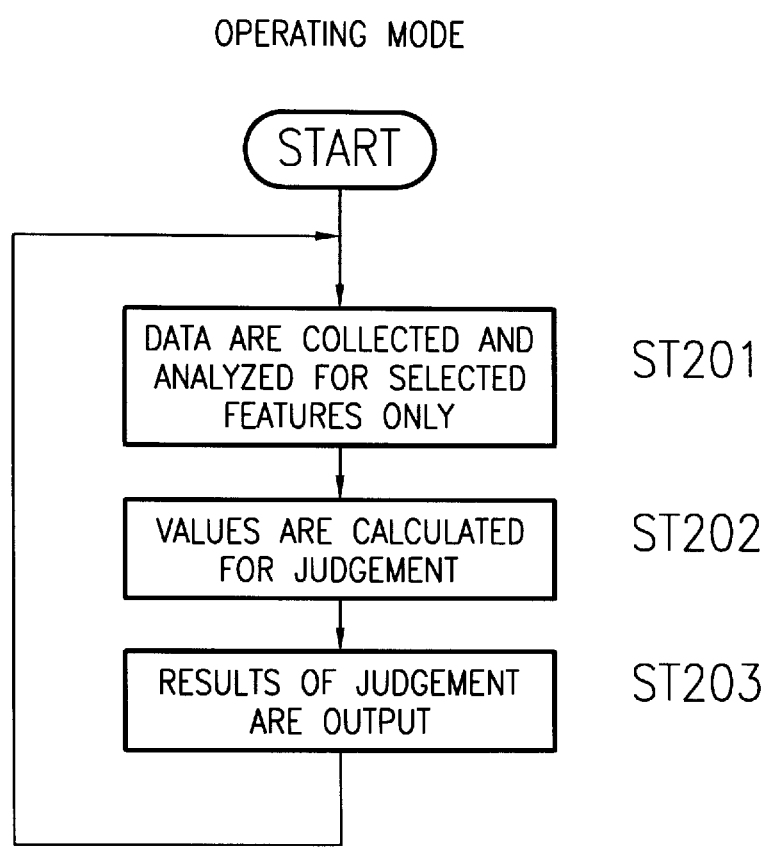
FIG. 3 is a flowchart of the processing executed in operating mode.

When the monitoring features to be monitored and the algorithm have been determined as described above, they are displayed on output unit 8, and the monitor goes into operating mode, pictured in FIG. 3, either automatically or in response to a command entered via input unit 7. The output of vibration sensor 2 which passes through amp 3, filters 4 and multiplexer 5 is sampled at high speed, and data for monitoring features $K_x$, $K_y$ and $K_z$ are obtained at given time intervals (Step 201). A given number of data are collected over a given sampling period, just as was done when the monitoring features were extracted in learning mode. The algorithm for each monitoring feature is used to produce the final data based on the data which were collected.

A determination is made for every value obtained as to whether it is within the normal range. In other words, maximum and minimum values are compared with the upper and lower limit values of the range, and a judgment is made as to whether the vibration of device 1 is normal or abnormal (Step 202). The result of this judgment is transmitted to output unit 8 (Step 203). This series of operations is executed repeatedly at high speed.

In addition to learning and operating modes, which were discussed above, the monitor has a number of supplementary modes, one of which is compulsory setting mode. This mode is implemented in response to a command to that effect entered via input unit 7. It allows monitoring features $K_x$, $K_y$ and $K_z$, which were selected automatically in learning mode as discussed earlier, to be changed via external input (a monitoring feature may be canceled and replaced with another monitoring feature). It also allows the normal range set up as a reference for determinations to be changed via external input ($\pm 3\sigma$ may be reset to $\pm n\sigma$). This configuration of the invention enhances the versatility of the monitor.

Figure 4:
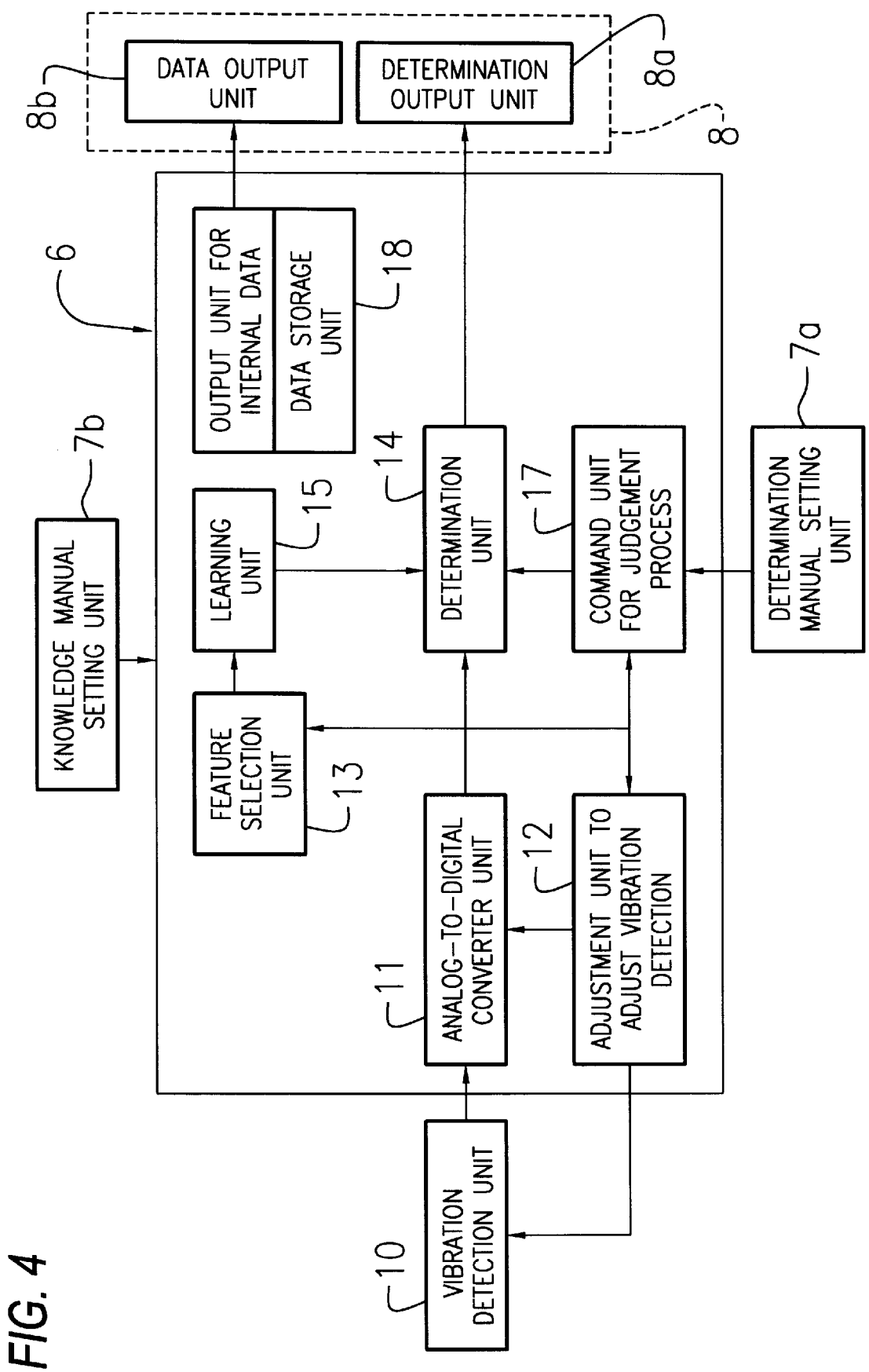
FIG. 4 shows the internal configuration of the computer.

FIG. 4 shows an example of the internal configuration of computer 6, which executes the processing discussed above. Component 10 in FIG. 4 is the vibration detection unit. It consists of the vibration sensor 2, variable-gain amp 3, filters 4 and multiplexer 5 shown in FIG. 1.

The analog output of vibration detection unit 10 is transmitted to an analog-to-digital converter unit 11, where the data for a given sampling period are converted to digital signals. These signals are then transmitted to adjustment unit 12, where the detection of vibration is adjusted; feature selection unit 13, where the monitoring features are selected; and determination unit 14. Units 12 and 13 are operated in learning mode; unit 14 is used in operating mode.

In adjustment unit 12, the gain of variable-gain amp 3 is adjusted based on the data obtained during learning, switching commands are transmitted to multiplexer 5 to select the necessary filter (this consists of transmitting a control signal to vibration detection unit 10) and the sampling period for which the data are converted to digital signals is adjusted (this consists of transmitting a control signal to analog-to-digital converter unit 11).

Feature selection unit 13 executes the processing described earlier to determine which monitoring features will be needed. It transmits these monitoring features and their normal range (including the necessary control algorithms) to learning unit 15. During the actual monitoring, determination unit 14 obtains the reference values for the monitoring features stored in learning unit 15 which correspond to the signals it receives from analog-to-digital converter unit 11. It determines whether the data are within the normal range and outputs the result of its determination.

Adjustment unit 12 determines when the filters used in Steps 102 and 103 in FIG. 2 should be switched and how long the sampling period should be. Feature selection unit 13 analyzes the data and executes Steps 104 and 105. Determination unit 14 executes the processing in Steps 201 and 202 of FIG. 3. The monitoring features extracted by selection unit 13 differ from those extracted by determination unit 14, but the actual extraction processing (i.e., the calculations) are the same.

Figure 5:
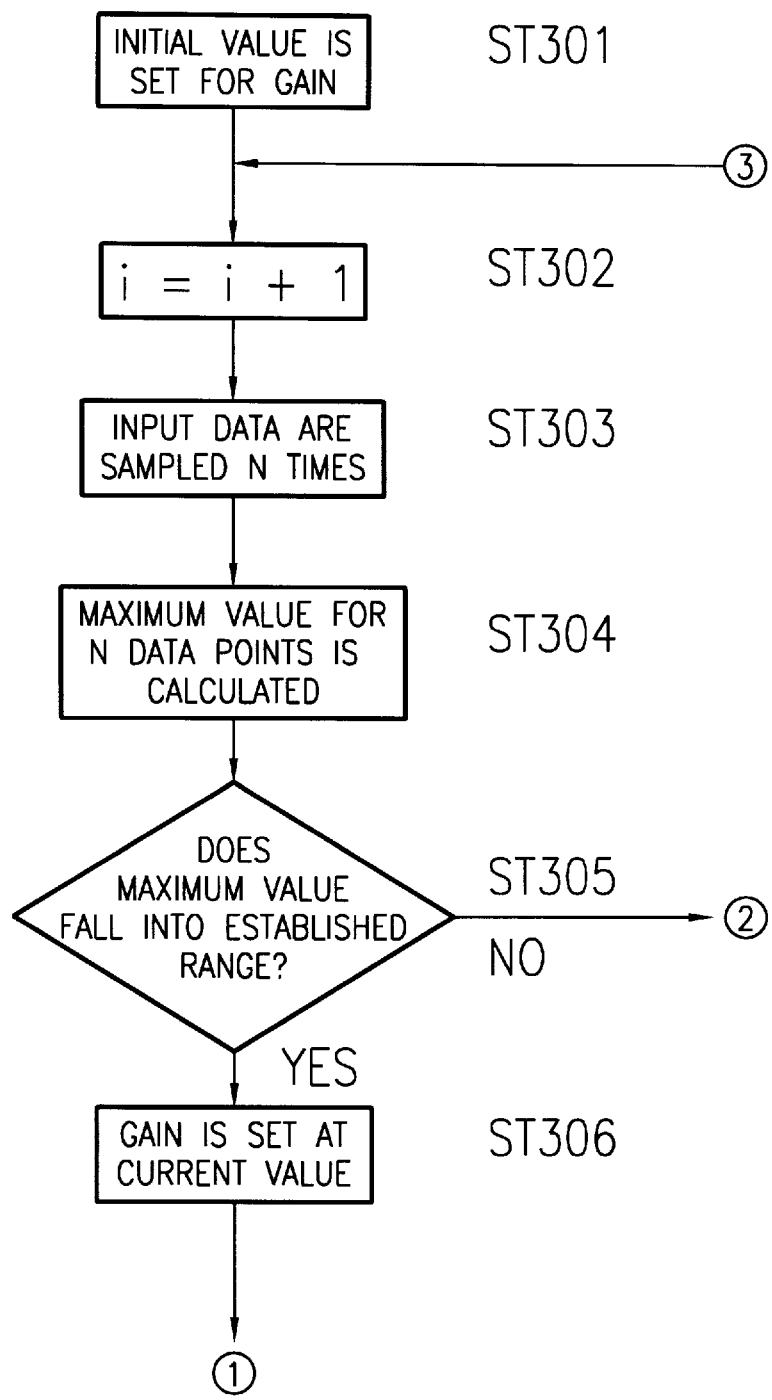
FIG. 5 is a portion of a flowchart showing how the gain of the amp is adjusted. This is one of the functions of adjustment unit 12.
Figure 6:
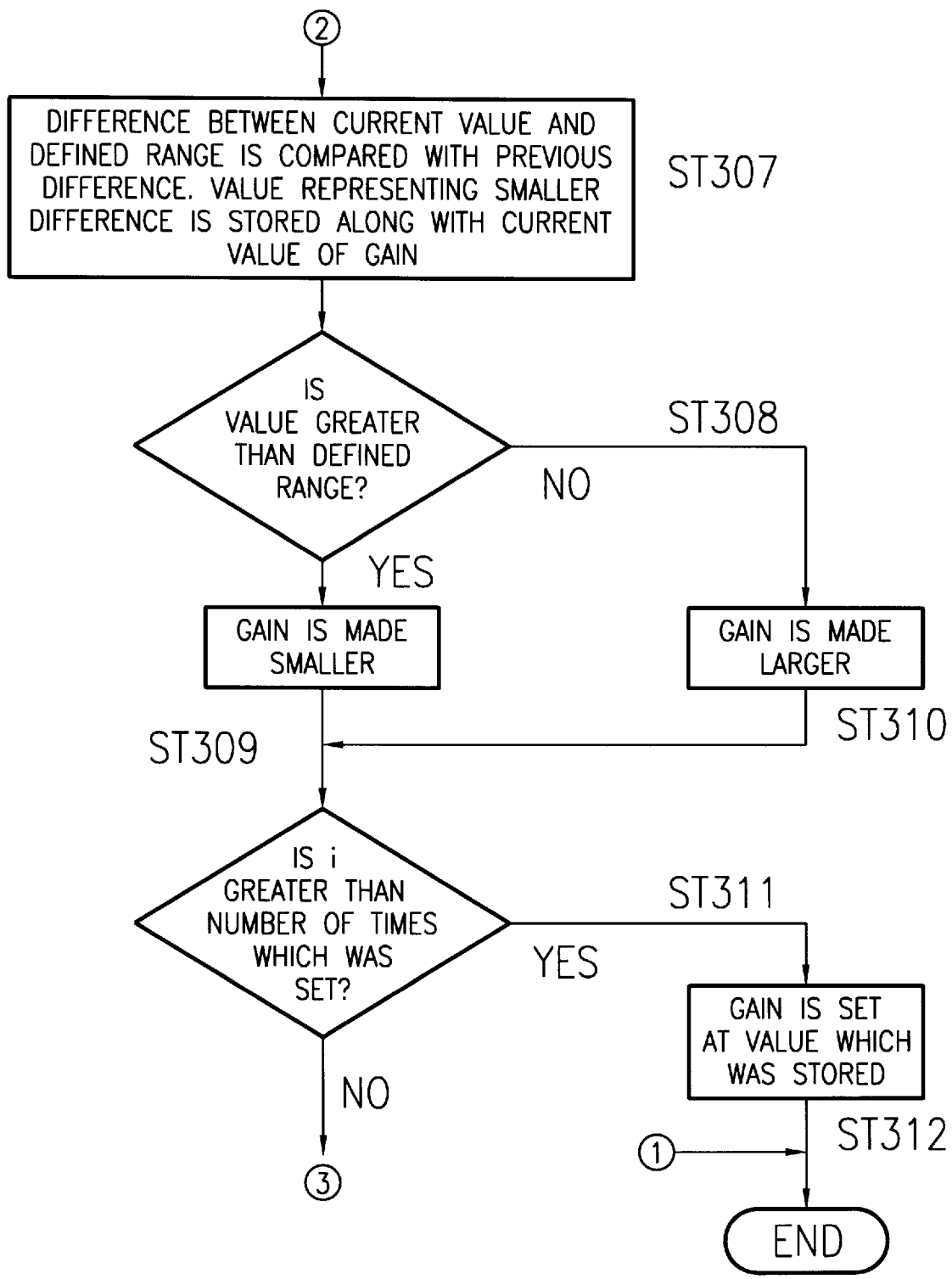
FIG. 6 is a portion of a flowchart showing how the gain of the amp is adjusted. This is one of the functions of adjustment unit 12.

The actual function of adjustment unit 12 is shown in FIGS. 5 through 10. The first function, which is shown in FIGS. 5 and 6, is that of adjusting the gain of variable-gain amp 3. As its initial value, the gain is set to a previously determined value, and i is set to "0" (Step 301).

The input signal from vibration detection unit 10 is sampled and data are collected n times. A determination is made as to whether the maximum value in the collected data falls within a previously established range (Steps 302 through 305). If it does fall within that range, the gain is set at its current value (Step 306).

If it does not fall within that range, the gain is adjusted so that it does (if the maximum value exceeds the range, the gain is made smaller; if it is below the range, the gain is made larger) (Steps 308 through 311). We return to Step 302 and again collect data and process a determination. This processing is repeated until the answer in Step 305 is "yes", i.e., until the maximum value falls within the established range.

In this example, there can be instances in which the adjustment process goes into an endless loop. If after a certain number of adjustments the maximum value still does not fall within the prescribed range, the gain must be set at the value which most nearly approaches the range. This is the reasoning behind Step 307, in which the gain nearest the prescribed range is stored. If the value of i which is incremented in Step 302 exceeds a given number, we proceed from Step 311 to Step 312 and set the gain at the value stored in Step 307 (Step 312).

Figure 7:
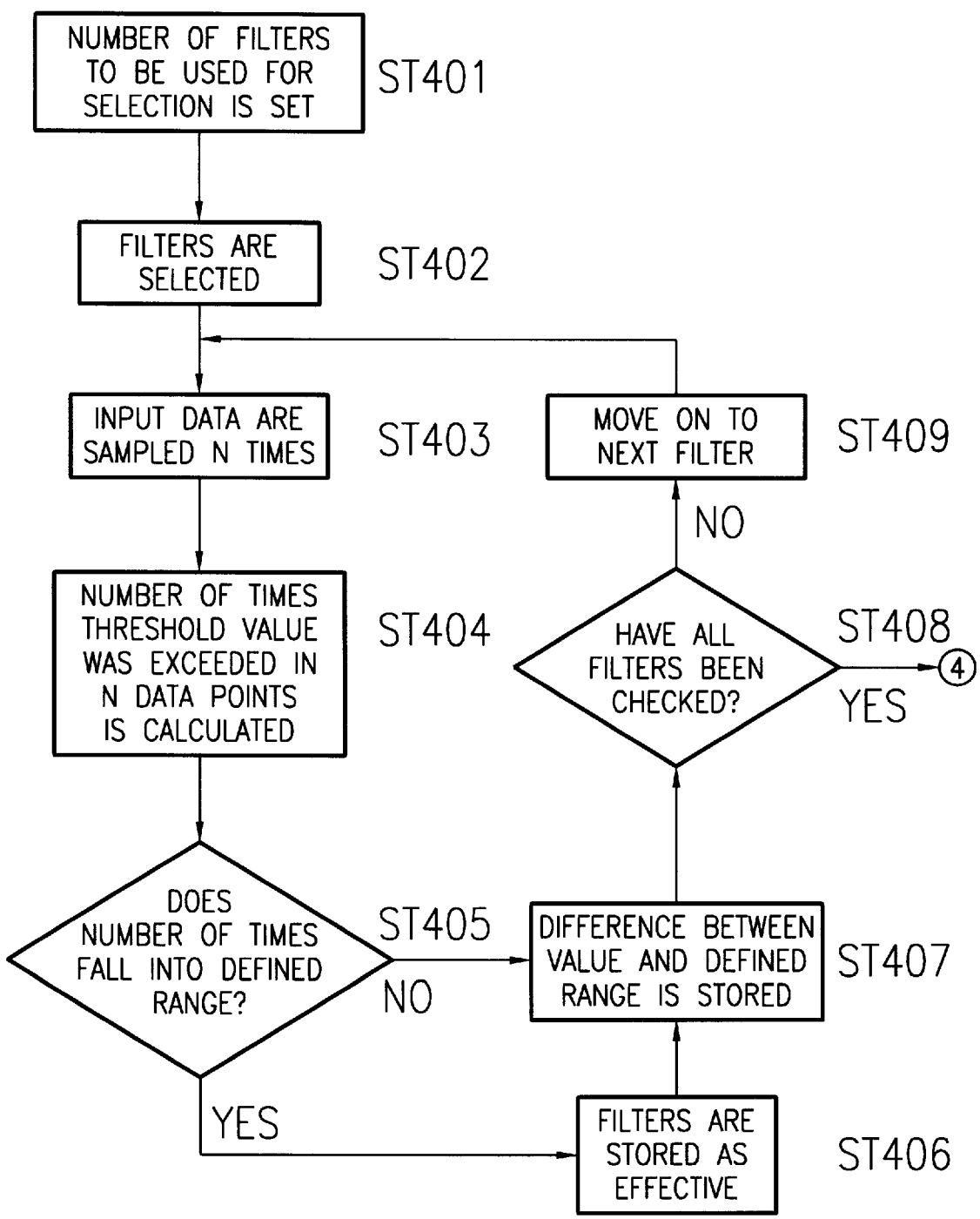
FIG. 7 is a portion of a flowchart showing how the filters are adjusted. This is one of the functions of adjustment unit 12.
Figure 8:
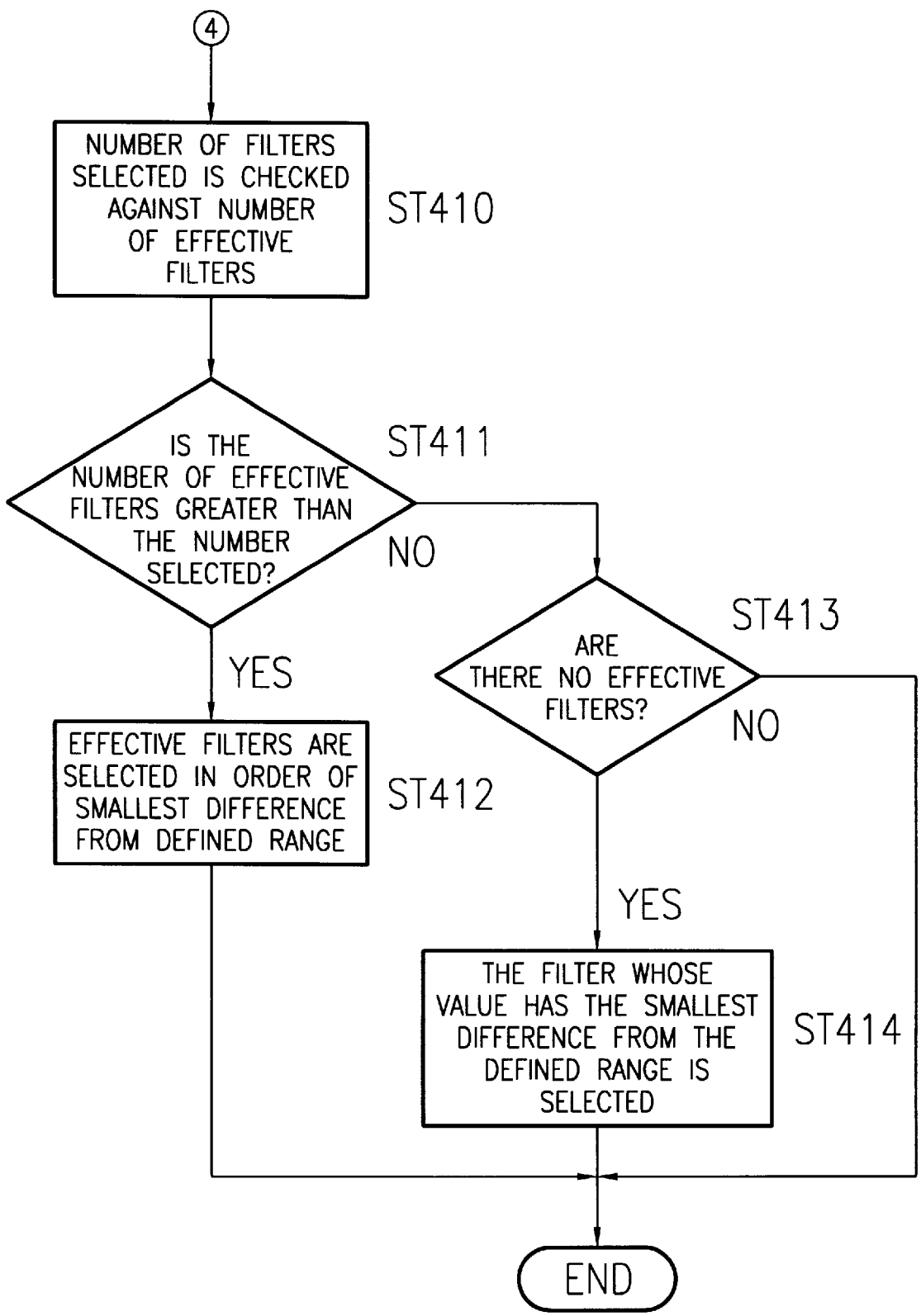
FIG. 8 is a portion of a flowchart showing how the filters are adjusted. This is one of the functions of adjustment unit 12.

Adjustment unit 12 also functions to automatically adjust the filters, as shown in FIGS. 7 and 8. First, the number of filters to be used is set (Step 401). Since in this example there are three filters, 4a through 4c, which may be used, a number between 1 and 3 will be set at this time (since all three filters are to be used, no adjustment will be made during learning). This value is entered from the exterior via input unit 7.

The first filter is selected according to a predetermined order (Step 402). The input signal from vibration detection unit 10 is sampled and data are collected N times. The number of data points within the collected data which exceed a threshold value is obtained, and it is determined whether this number falls within a previously defined range (Steps 403 through 405). If it does, the fact that this filter is effective is stored. The difference between this number and the defined range is also stored (Steps 406 and 407). If the number does not fall within the defined range, the difference between this number and the range is stored (Step 407). This processing is executed for every filter (Steps 408 and 409).

When all the filters have been checked, the number of effective filters which is stored is compared with the number selected in Step 401. If the number of effective filters exceeds the number selected, the performance will be good. Effective filters are selected in the order of the smallest distance from the defined range (Step 412). Determinations in operating mode will be made using these filters.

If the number of effective filters is smaller than the number selected, we proceed to Step 413, where it is determined whether there are any effective filters. If there are, all the effective filters stored in Step 406 are selected. If there are not, the filter whose value is closest to the defined range is selected as an effective filter (Step 414).

Figure 9:
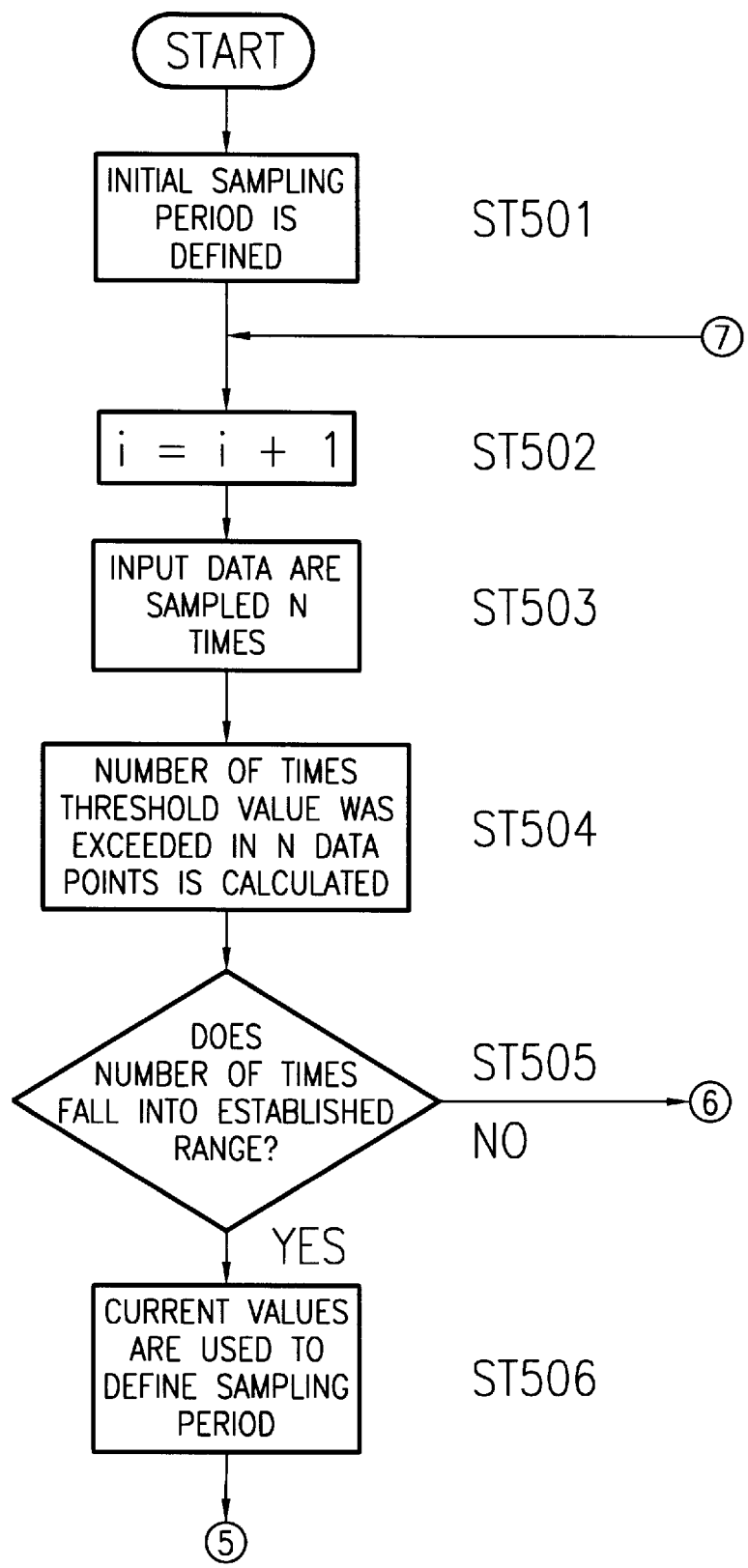
FIG. 9 is a portion of a flowchart showing how the sampling period is adjusted. This is one of the functions of adjustment unit 12.
Figure 10:
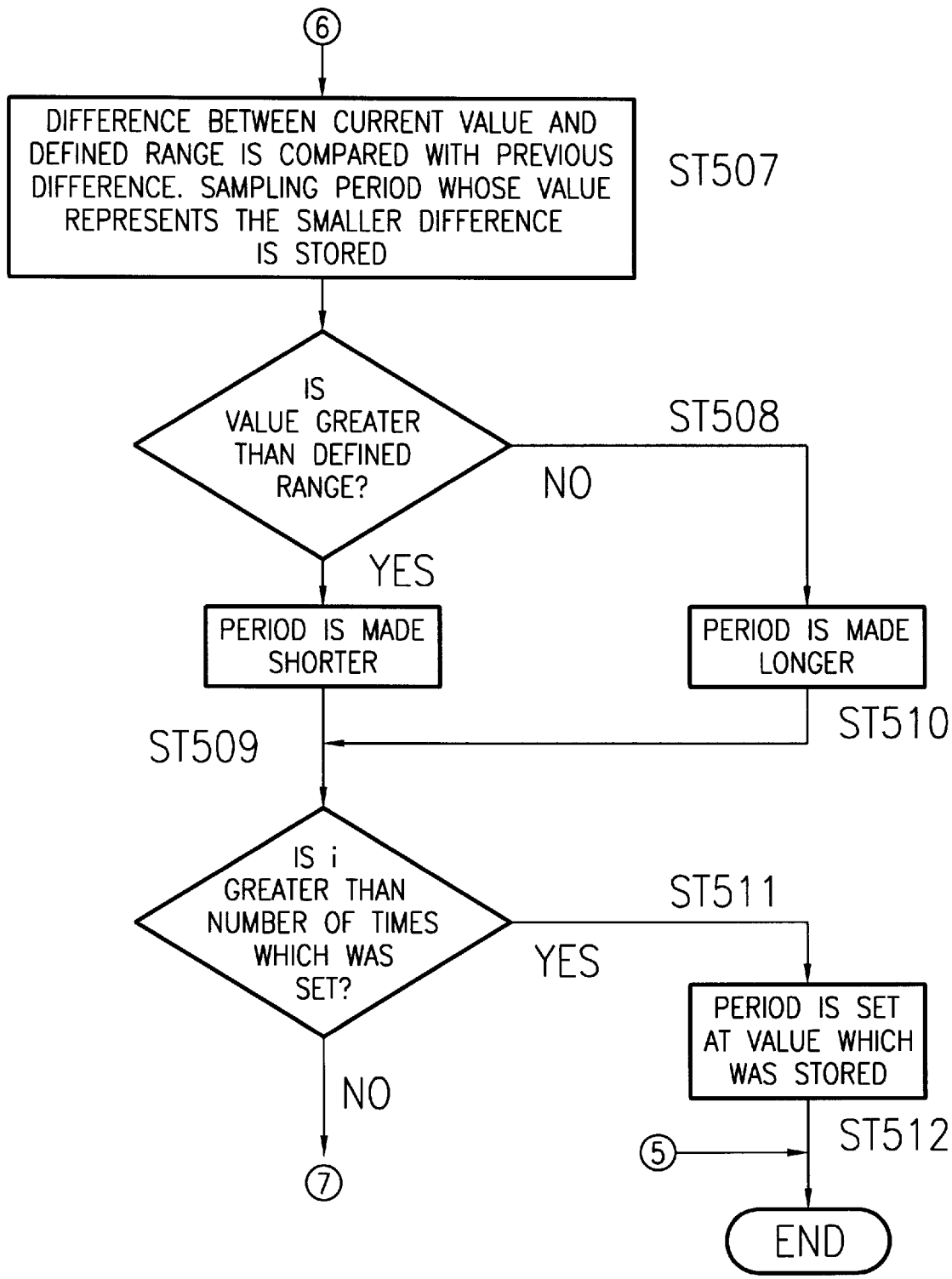
FIG. 10 is a portion of a flowchart showing how the sampling period is adjusted. This is one of the functions of adjustment unit 12.

Adjustment unit 12 also has the function of automatically adjusting the sampling time, as shown in FIGS. 9 and 10. Here the initial value is set just as with the gain adjustment described above (Step 501). Data are collected N times during this sampling period and the number of times the value of the data exceeds a threshold is obtained. If this number falls within a prescribed range, the sampling period is set to this value (Steps 502 through 506).

If the number does not fall within the prescribed range, the sampling period is adjusted until it does (Steps 508 through 511). If the number does not fall within the range after a fixed number of adjustments, the sampling period with the value closest to the range (i.e., the one whose value is least different from the prescribed range) is selected as the one to be used in operating mode (Steps 507 and 512). This concludes the adjustment of the sampling period.

Figure 11:
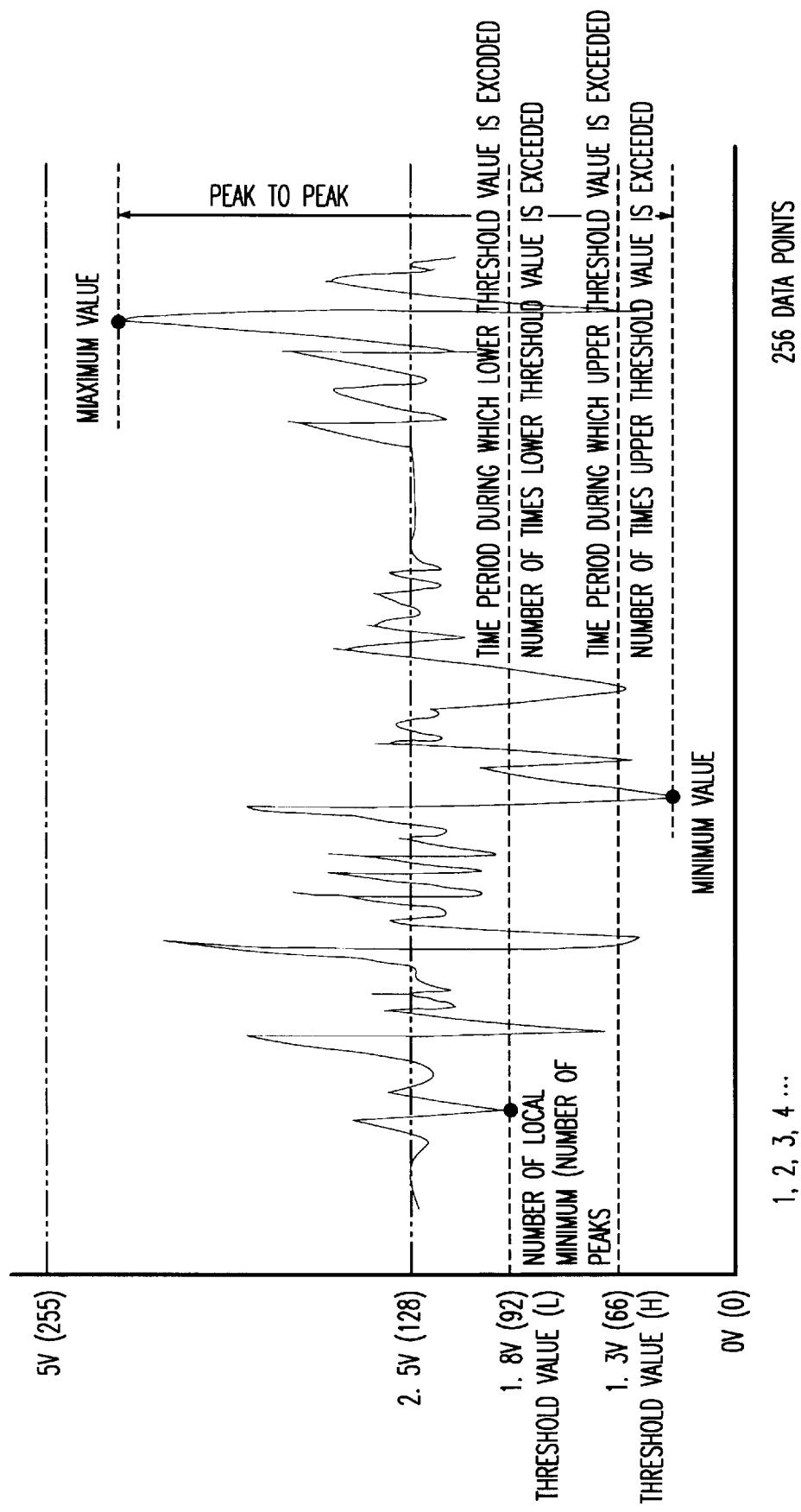
FIG. 11 illustrates how sampling features are extracted.

Based on the gain, filter and sampling period adjustments and determinations by the aforesaid adjustment unit 12, feature selection unit 13 takes in a previously determined number (for example, 256) of the data points output by analog-to-digital converter unit 11. If more than one filter is being used, unit 13 takes in the output of each filter. When the data are arranged in temporal order (i.e., the order of acquisition), waveform data can be obtained, an example of which is shown in FIG. 11. The sampling features are extracted from these waveform data, and values are calculated which represent the aforesaid eight sampling features to be sampled.

Since in this example the output of vibration detection unit 10 ranges from 0 to 5 V, the offset value for zero vibration is adjusted to an intermediate value of 2.5 V. In this case, the sampling feature consisting of crossing a threshold is extracted only on the negative side (under 2.5 V), so the lower threshold value (here 1.8 V) is set close to the intermediate value and the upper threshold value (here 1.3 V) is set further away from the intermediate value. Viewed from the perspective of the relationship of the numerical values, the crossing of either of these thresholds consists of moving to a value smaller than the threshold value.

The standard deviation value and other values are found for each sampling feature in the collected data, and the sampling features with the smallest deviation values are selected as the monitoring features to be used to evaluate the vibration in the operating mode in this invention. The normal range of the selected monitoring features is obtained and sent to learning unit 15.

Determination setting unit 7a and knowledge setting unit 7b in FIG. 4 are both components of input unit 7 in FIG. 1. When command unit 17 receives a start command (to begin functioning in operating mode) from setting unit 7a, it sends adjustment unit 12 a stop command, and adjustment processing ceases. At the same time, command unit 17 sends determination unit 14 a signal representing a start command. In response to this start command, determination unit 14 obtains from learning unit 15 the monitoring features and the judging algorithm (i.e., the upper and lower limit values which define the normal range). In operating mode, it then obtains the actual detection data output from analog-to-digital converter unit 11 and calculates a feature value for each monitoring feature. It determines whether these feature values are within the normal range comparing with the monitoring features, and outputs the results to determination output unit 8a, a component of output unit 8.

In addition to the aforesaid start command, command unit 17 sends determination unit 14 a command to determine whether the judgment is valid. If it is not, the judgment processing is terminated and the previous result is saved. Various other commands are issued in response to input from determination setting unit 7a.

Figure 12:
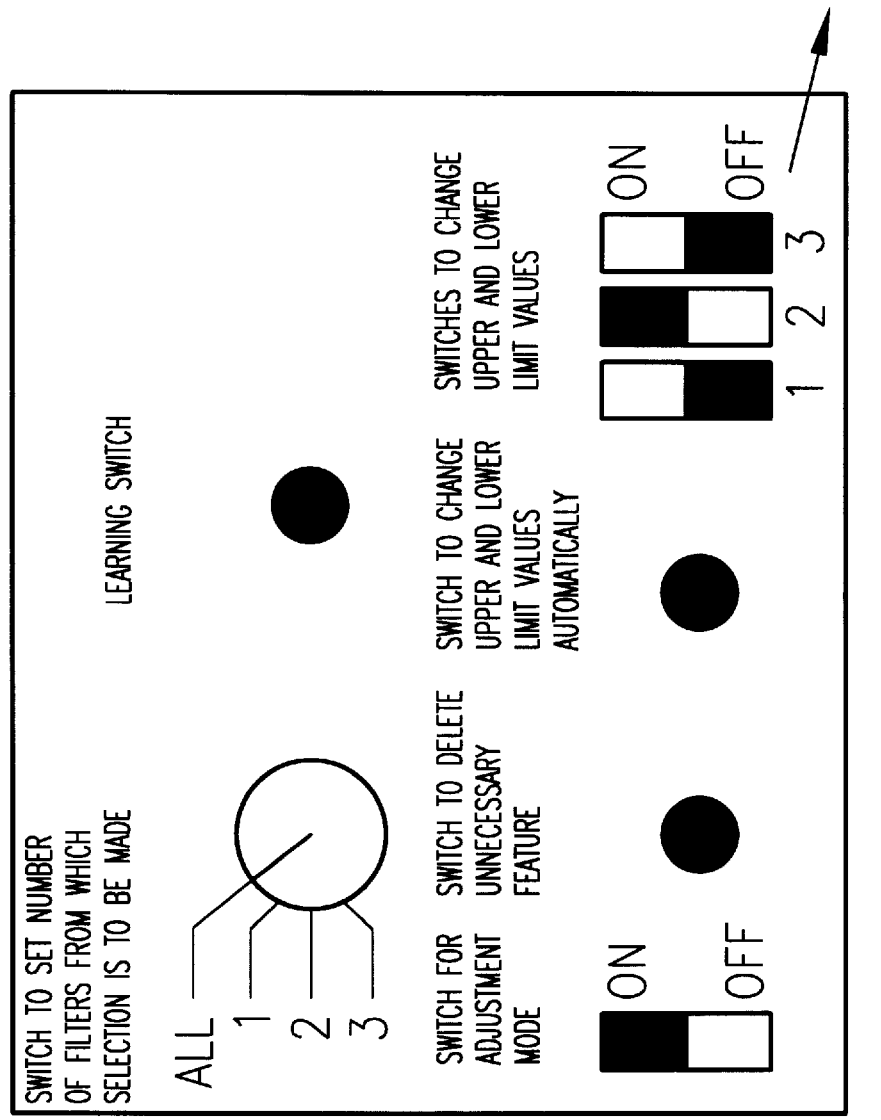
FIG. 12 shows an example of an operating panel on the input unit.

Knowledge setting unit 7b receives various commands needed to operate the monitor in learning mode. An example of its operating panel is given in FIG. 12. When the learning switch (or button) is turned on, learning mode goes into effect and start commands are sent to adjustment unit 12 and selection unit 13. When the adjustment mode switch is turned on, learning mode stops; if a determination is in process in operating mode, the conditions for the determination (the monitoring features, the normal range of their feature values, and so on) can be adjusted.

The output of the switch used to set the number of filters is sent to adjustment unit 12. The number of filters selected is input when the processing in Step 401 of FIG. 7 is executed. The limit value switches are used to set the width of the margins when the normal range is defined. In this example, the range is set under normal conditions at ±3σ, so the DIP switches are set as shown in the drawing. To change the width of the margin as discussed above, the DIP switches are adjusted.

In this example, the results of determinations made and the feature values extracted in operating mode are stored in storage unit 18, an EEPROM or S-RAM, and they are output on data output unit (display) 8b. If an erroneous determination is made, the cause of the error (if the vibration was mistakenly determined to be abnormal, the monitoring feature whose value was found to be outside the normal range and its feature value at that time) is displayed. If the user depresses the switch to cancel the unnecessary monitoring feature, the monitoring feature in question will not be used in subsequent determinations. In this way the user selects the monitoring features which are more likely to result in a correct determination, thus enhancing the accuracy of the monitor.

As an alternative to canceling the unnecessary monitoring feature in this way, the limit value switches can be depressed to alter the normal range. When the switches are depressed, the erroneously defined normal range of values for the monitoring feature will be altered so as to include the values judged to be abnormal. This is done by changing the upper limit value and/or the lower limit value. If, for example, a value is judged to be outside the normal range when it is not, the normal range will be expanded until it includes that value. If an abnormal value is judged to be normal, the range is constricted.

In the embodiment described above, the judgment as to whether the vibration is normal or abnormal is made by controlling threshold values which are upper and lower limit values. However, the invention is not limited to this case only. The aforesaid judgment of normal or abnormal vibration may also be accomplished with considerable accuracy by means of fuzzy inference.

Figures 13, 14:
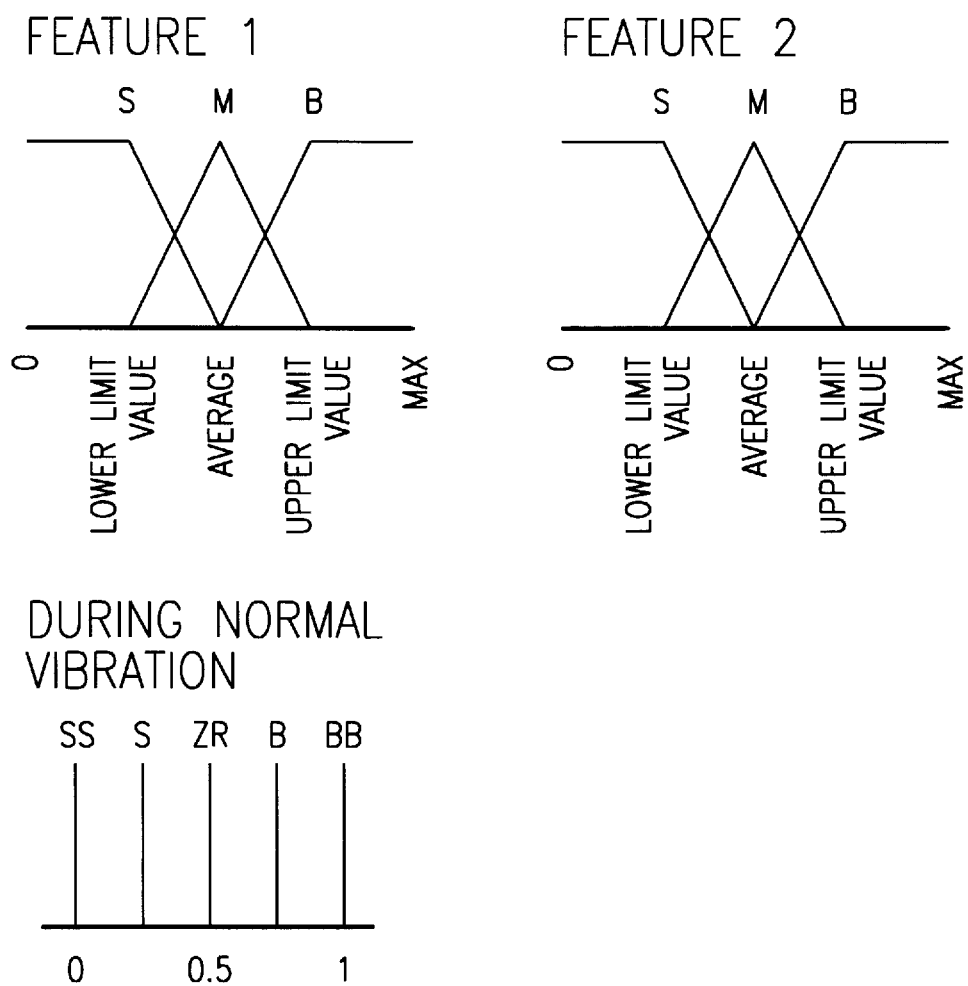
FIG. 13 gives an example of rules which would be used to make a determination by fuzzy inference.
FIG. 14 gives an example of membership functions which would be used to make a determination by fuzzy inference.

In this case rules such as those shown in FIG. 13 and membership functions such as those shown in FIG. 14 are provided as fuzzy knowledge. (In this example, two monitoring features (i.e., items to be monitored) are selected.) This basic knowledge is stored in learning unit 15 (in data storage unit 18). The extraction and selection of monitoring features in learning mode and the generation of a judging algorithm, both essential features of this invention, are accomplished as follows.

The monitoring features are extracted just as in the embodiment discussed above. The normal range (i.e., its upper and lower limit values) is also obtained as described above. The average value of the monitoring features used for determining the monitoring items is assigned a goodness of fit of "1". The triangle such that the upper and lower limit values which define the normal range have a goodness of fit of "0" is called function M. The goodness of fit from 0 to the lower limit value is "1". The first function such that the average value has a goodness of fit of "0" is called function S. The goodness of fit from the upper limit value to the maximum value is "1". The second function such that the average value has a goodness of fit of "0" is called function B.

To make an actual judgment, a feature values are extracted from monitoring features and an inference is made to the feature values based on the aforesaid fuzzy knowledge. The judgment whether the vibration is normal or abnormal is made by determining whether the fitness of the inference exceeds a certain value.

In the embodiment discussed above and its modified version, the monitoring features are selected out of sampling features which evince slight variance, but these features are not weighted. The invention is, however, not limited to this case only. It would also be possible to assign a weight to each monitoring feature.

Let us use as an example the case of an electric motor which drives a machine. In this case there may be a relationship such that when the period during which the threshold value is exceeded is within a given range, abnormal vibration is likely to occur. Although there is a certain amount of variation during normal vibration, it would still be appropriate to use this monitoring feature to determine when abnormal variation is occurring. In such a case a given coefficient (a positive number less than one) could be attached to the monitoring feature "period during which threshold value is exceeded" to make it easier to select. This would have the effect of reducing the standard deviation value. If certain features must be selected as monitoring features to be monitored, they can be given a coefficient of "0".

The weights may be assigned manually via knowledge setting unit 7. It will be also a practical that the monitoring features not needed for a determination could be extracted from operating mode but the feature values of these extracted monitoring features can be stored in data storage unit 19. If there is a monitoring feature which shows any distinct changes when vibration is abnormal, it will then be picked up as a actual monitoring feature. When the settings are readjusted, the coefficient of the reassigned monitoring feature could be changed automatically for enhancing reliability.

In the following sections, we will further disclose the variations of this invention. In the embodiments we have been discussing, the features to be monitored and the values of the normal range which were determined in learning mode are stored in learning unit 15; however, it would also be possible to record the monitoring features and the other pertinent data and associate each data set with a different device to be monitored. If a number of devices (fixed equipment, discrete devices, and so forth) are to be monitored, the features and normal range for each device can be stored and a selection means (such as a set of push buttons) can be provided by which the user can select which device is to be monitored. In this case, the user would press the appropriate button before recording the monitoring features and the normal range in learning mode. Pressing the same button in operating mode will then select the monitoring features and normal range which are required for a determination. Thus the monitoring features to be watched and the normal range of their values can be recorded in learning mode for each device to be monitored. The monitor does not need to learn new values each time it is switched to a different device, but can go directly into operating mode and begin monitoring that device.

We shall next discuss an application of the aforesaid vibration monitor.

Application in Product Inspection Line

Here, the vibration monitor is used in the process of inspecting a product (a printer, for example) which contains a source of vibration such as a motor. First the vibration monitor of this invention is placed in a specified location on the product inspection line. At this time the vibration sensor, which is connected to the monitor, is mounted on a robot arm which can be moved to any needed location within a three-dimensional space. When the product to be inspected reaches the specified location on the inspection line, the robot arm moves so that the vibration sensor makes contact with the product. The product is then activated, and the sensor detects its vibration. Feature values are extracted based on the output of the vibration sensor, and the product is inspected using the features and normal range (i.e., the judgment scheme) as determined in learning mode.

To change the product to be inspected for vibration, a product which is known to be normal is sent down the line and used as a source of vibration in learning mode. When this procedure is completed, the monitor is switched to operating mode and the new product can be inspected.

Heretofore, a specially trained person had to select a monitoring features for the monitor to use based on his knowledge of the vibration source and how it was built into the product to be inspected. The monitor of this invention is much simpler to convert to another task. There may be occasions on which a change in the way the same product is placed on the inspection line causes a change in its vibration characteristics. In these cases, too, the new characteristics can be mastered simply by switching the monitor to learning mode.

When the monitor is in learning mode, it stores a monitoring method (the monitoring features, their normal range of values, etc.) for evaluating the product to be inspected. Subsequently, whenever the monitor needs to inspect the same sort of product, it can employ this method in operating mode without having to reenter learning mode. Thus the only task required to change the setup to inspect a type of product which has been inspected previously is to select a new monitoring method. This greatly simplifies changing the setup.

Application for Universal Equipments

Next we shall discuss how the vibration monitor of this invention can be used to diagnose equipments. The floor of a factory will invariably have a wide variety of equipment which must be monitored for vibration, including boilers, air conditioners, generators, lathes, presses and conveyors. The same vibration monitor is installed on every device regardless of what sort of vibration it produces. The monitor for each device is operated in learning mode while the device is running normally to initialize it for that device.

In some cases, different inspection lines are set up for each product so that each line will inspect only one product. Here there is no need to change the setup; however, the vibration monitor of this invention is also beneficial in such cases. The same type of monitor can be installed on each line and operated in learning mode at least once using a normal product to initialize the monitor for that line.

In other words, the same vibration monitor can be used for devices or equipment with many different sources of vibration. It is more nearly universal than its predecessors. Since the monitoring features are selected automatically in learning mode, it may happen that the actual monitoring features monitored in operating mode are different for each devices or equipments. However, any monitoring device with identical specifications may be used for them.

Application for Hand-Held Monitor

Installing a fixed vibration monitor to each device or equipment to be monitored as described above is expensive. An alternative is to make periodic checks using a portable vibration monitor. In this case, a monitoring device is operated in learning mode while each device or equipment to be monitored is operating normally. The monitoring method selected at this time for each device or equipment is stored in the monitor as data associated with these device or equipment. When it is time for a periodic check, the user selects the monitoring method (monitoring features and normal range) for the device or equipment to be checked and initiates operating mode. In this way a single monitor is needed to check or monitor a number of different devices. Just as in the modified version of learning unit 15 discussed earlier, this hand-held monitor can store in learning unit 15 the various devices or equipments to be monitored and, in association with each device, the monitoring method consisting of the monitoring features and their normal range. It must also have the capability of selecting features to be used in an inspection.

Figure 15:
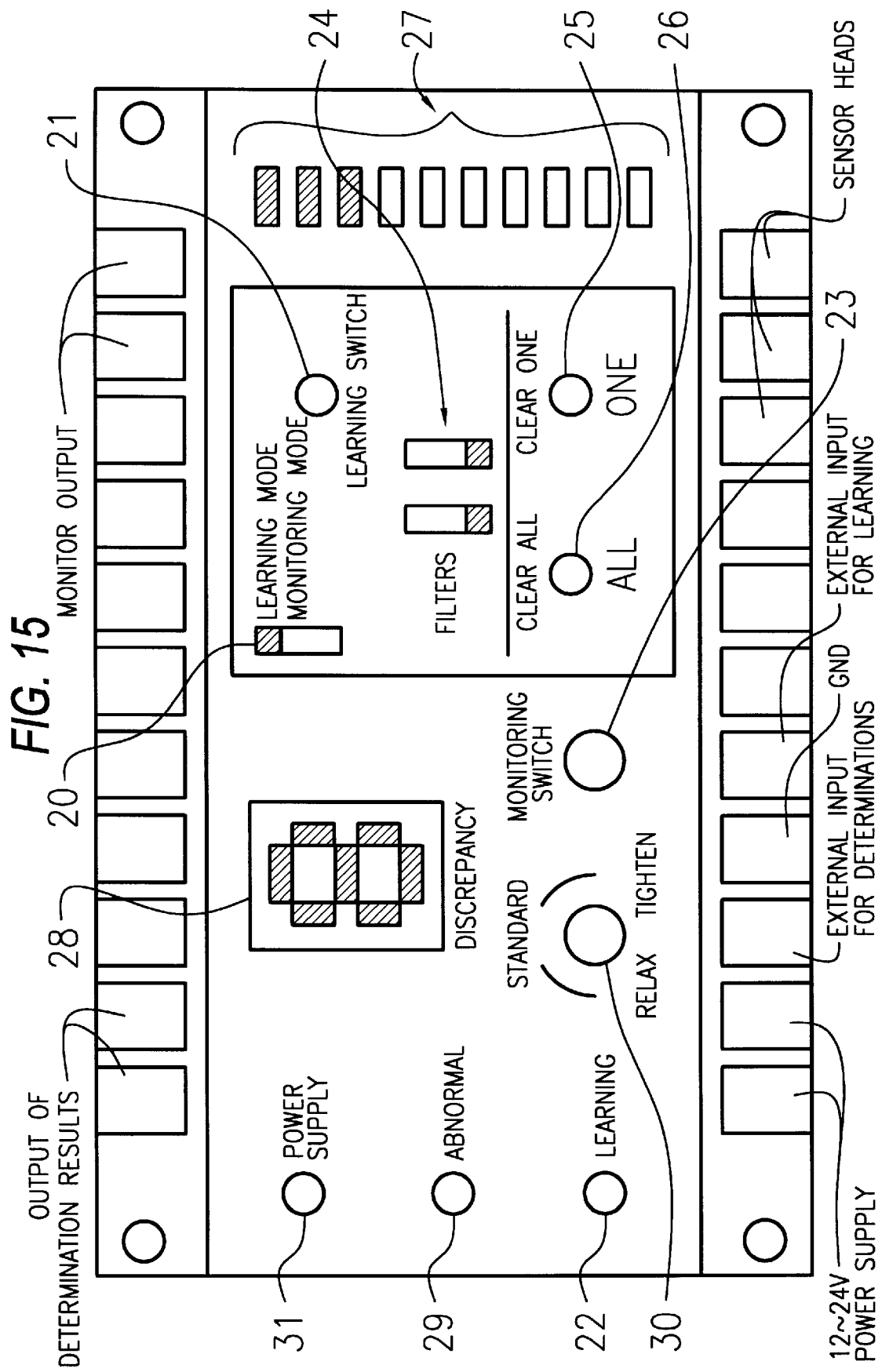
FIG. 15 shows an example of an operating panel which might be used on another ideal embodiment of this invention.

We shall next discuss another ideal embodiment of the vibration monitor of this invention. This embodiment is based on the one discussed previously. It allows the user to know easily whether the monitor is operating in learning mode. FIG. 15 shows the front panel of this monitor.

To actuate learning mode in this monitor, the user sets switch 20 to "learning mode". At this point, learning has not yet begun. To actuate learning, the user depresses learning switch 21. The monitor goes into learning mode, and LED 22, the learning mode indicator on the monitor, lights up. LED 22 goes out when learning mode is concluded. By observing whether learning indicator LED 22 is on, the person using the monitor can easily determine whether it is in learning mode.

This makes it easier for the user to determine when to turn off the source of vibration being used for learning. The user must also keep watch during learning so that the device is not affected by any vibration which would be perceived by the monitor as noise. With this monitor, the user can easily determine when it is safe for him to stop watching. He can also determine when it is appropriate to enter the command to initiate operating mode. Since the length of time required for learning may differ according to the characteristics of the waveform of the vibration, it is not possible to specify it precisely in advance. For this reason it is useful to have an indicator light 22. When LED 22 lights up, it indicates to the user that learning mode is in effect.

As an alternative to LED 22, it would also be permissible to use digital output (electrical output via a signal line) which goes on when learning is in progress and off when learning is completed. Another possibility would be to have a liquid crystal display on the monitor which would give a message to indicate when learning was in progress. The same effect could be achieved by having an LED flash or a buzzer sound for a prescribed time when learning has been completed to output that information to the user. If operating mode begins automatically when learning has been completed, the display can indicate that operating mode is in effect.

We shall now discuss another ideal embodiment of this invention. This monitor selects a monitoring method based on multiple learning results or results obtained in the past. However, its basic functional configuration does not differ from that of the embodiments discussed above. Its internal configuration is the same as that pictured in FIGS. 1 and 4; only a portion of the processing function of learning unit 15 is different. The front panel of this monitor is the same as that shown in FIG. 15.

We shall first discuss the panel shown in FIG. 15. In this embodiment, the operator manually operates a switch to determine if the monitor is to be in the learning or operating mode. Switch 20 selects either the learning mode or the operating mode. Although operating switch 20 selects one of the modes, the mode selected does not go into effect immediately. It goes into effect only when the operator depresses either learning switch 21 or operating switch 23. In other words, the operator pushes button 21 when he has selected learning mode, and learning begins. He pushes button 23 when he has selected operating mode, and the monitor goes into operating mode. Without this configuration of switches, the monitor will not operate.

The filters to be used are selected by means of filter switches 24, two on-off DIP switches which can be used to indicate four different states. Specifically, these switches are used to select one of the following: "Use all filters;" "Use LPF;" "Use BPF;" or "Use HPF." The signal based on the state of filter switches 24 is ultimately sent to multiplexer 5, shown in FIG. 1.

In this embodiment, the data which have been learned can be stored. The most recent of these data, i.e., the data which are currently being used, can be cleared by depressing button 25 (Clear One). All of the learning data can be cleared by depressing button 26 (Clear All). These buttons allow the user to delete the data he no longer needs.

Indicators 27 display the level of the signal from the vibration sensor. These indicators display visually the state of the vibration detected by the sensor so that the user can evaluate it roughly.

This monitor can also determine the discrepancy between the monitoring method obtained in the current learning mode and that obtained in a prior learning mode. Display 28 indicates the degree of separation between the two methods. LED 29 lights up when the degree of separation exceeds a given reference value, i.e., when the methods are too different. In operating mode, display 28 and LED 29 are used to display the result of a monitoring. Display 28 shows how far the values of the monitored device are from the normal values. If they are outside the normal range, LED 29 will light up.

Knob 30 is used to adjust the normal range parameter of the judgment method. Turning this knob will expand or constrict the normal range. If the judgment of a trained person differs from that produced by monitor, this knob can be used to manually modify the monitoring method. This allows a more accurate judgment to be achieved.

LED 31 lights up when the power supply is connected to the monitor. A number of I/O ports are also provided. In the next section, we shall discuss the actual operation of the monitor.

a) How the Monitor Works in Learning Mode

It is permissible for learning to be executed only once. However, when the monitor is used to inspect a product, it is desirable that the monitoring method be based on the waveforms associated with a number of examples of the product, since individual examples may differ in quality. In this case learning should be repeated using a number of examples of the product. Depressing the learning switch again will cause learning to be executed an additional time.

In some cases, the waveform data input during an additional learning cycle will differ significantly from those obtained during the previous learning cycle. For example, different monitoring features may have been selected. In this case LED 29 will flash to indicate to the user that there is a problem. The discrepancy between these data and the previous learning data is displayed to the user. By deleting useless data, the user can achieve a more accurate monitoring method.

The first thing the user must do is set switch 20 to "learning mode". In this state, learning has not yet been initiated. He then adjusts the parameters of the device to be monitored to the values at which they are to be inspected. If the device is a motor, for example, he connects the power and adjusts the motor to the prescribed rpm. He attaches the sensor to the device and depresses switch 21 to initiate learning.

Figure 16:
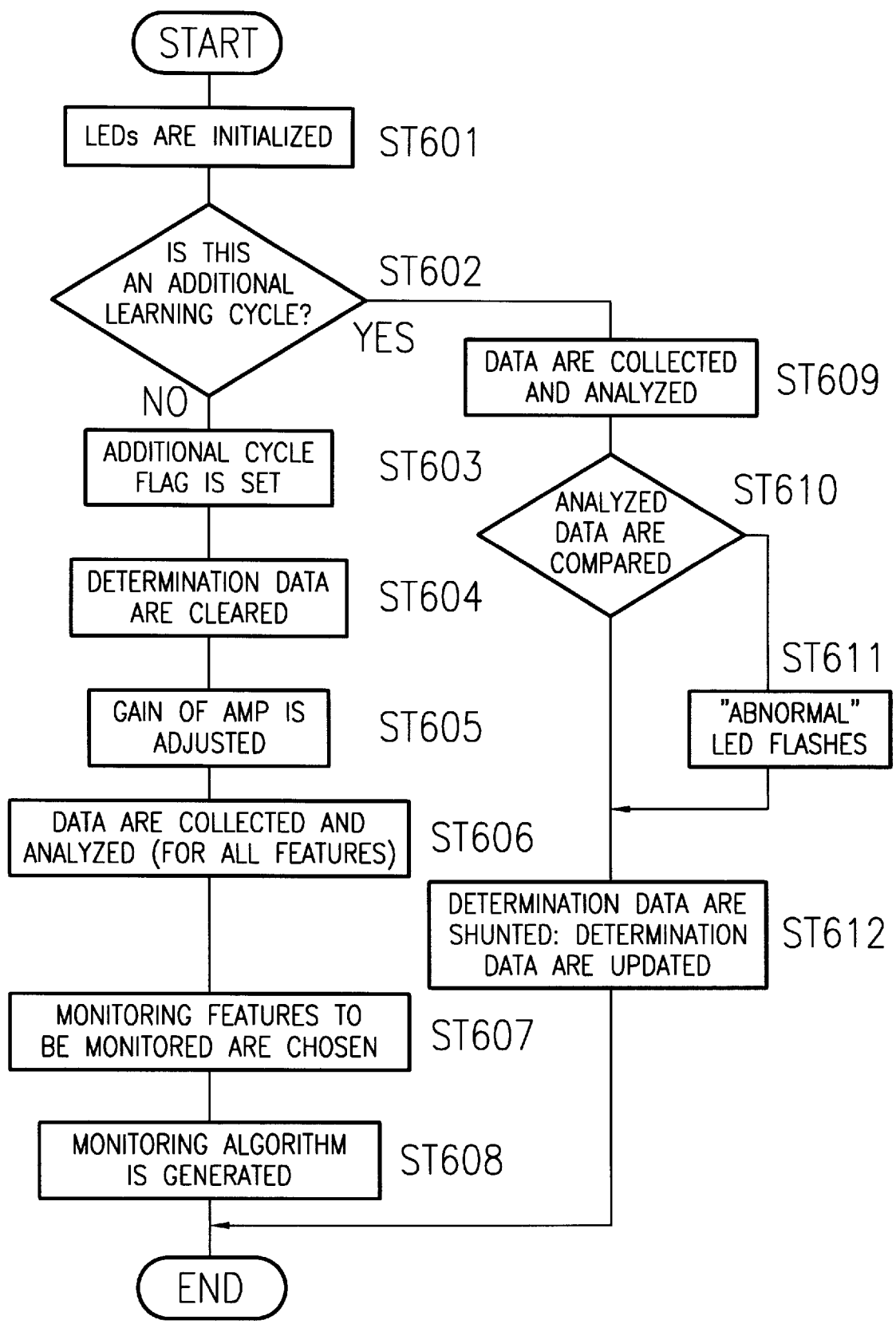
FIG. 16 is a flowchart of the operations executed in learning mode by another ideal embodiment of this invention.

When switch 21 is actuated, as shown in the flowchart in FIG. 16, all LEDs assume their initial state (Step 601). LED 22 goes on to indicate to the user that learning is in progress. LED 22 will go off when learning is completed. Since there are occasions on which LED 29 will need to light up in learning mode, its initial state is off.

It is then determined by means of a flag whether this is the initial learning cycle or an additional learning cycle. In the initial state, the additional cycle flag is not raised, so we proceed to Step 603, where we set the flag (Steps 602 and 603). The monitoring data stored previously (features to be monitored and their normal range) are cleared (Step 604) and the gain of variable gain amp 3 is adjusted appropriately (Step 605). The output of vibration sensor 2 (i.e., the normal waveform of the device to be monitored) is sampled at high speed by way of amp 3, filters 4 and multiplexer 5. The data collected are analyzed (Step 606), and features which meet certain conditions are selected as the ones to be monitored (i.e., as monitoring data) (Step 607). Based on the analysis of the selected features, an algorithm (i.e., the normal range) is generated which can be used to determine whether the vibration is normal or abnormal (Step 608). This completes the processing. Since the processing in Steps 604 through 608, which is executed on the initial learning cycle, is identical to that shown in Steps 101 through 105 of the flowchart in FIG. 2, we shall omit a detailed discussion of it here.

On subsequent learning cycles, the answer in Step 602 will be "yes", so we will proceed to the additional learning routine starting with Step 609. Here, just as in Step 606, waveform data are collected and analyzed (Step 609), and the resulting monitoring data are compared with the data obtained on the previous cycle or cycles (Step 610). If there is a large discrepancy between the two data sets, LED 29 lights up to inform the user that the data are abnormal, and he is shown how large the discrepancy is (Step 611).

A significant discrepancy could, for example, be defined as a case in which the average value for a monitoring feature is more than one standard deviation value from the average value for the same monitoring feature as determined on previous learning cycles. On a single learning cycle, perhaps a hundred waveforms may be captured. Thus even if there has been only one previous learning cycle, a standard deviation value will be available for each monitoring feature. The monitoring processing described above can and will be executed on every subsequent cycle.

In this embodiment, the discrepancy between the two data sets is obtained as follows. The average value during this learning cycle is obtained, for every monitoring feature selected in previous learning cycles. The average values for these monitoring features on previous cycles and the standard deviation values are obtained. A coefficient is, then, obtained which indicates how large the deference between current and previous average of monitoring features against previous standard deviation value. Such a coefficient is obtained for each monitoring feature, and the largest coefficient is used as the value of the discrepancy.

Next, the monitoring data obtained up until the preceding cycle are shunted to the memory, and the monitoring data are updated based on the current data regardless of whether they are normal or abnormal (Step 612). If k learning cycles have been completed before this cycle, the monitoring data are updated by assigning the current data with a weight of $1/(k+1)$ as follows.

The average value and the standard deviation value for each feature are obtained as follows. Let us call the average value for a given feature after k learning cycles $M_k$, the square of the average value $N_k$, and the standard deviation value $S_k$. After k+1 cycles, m is the average value of the aforesaid monitoring feature when p cycles' worth of waveforms have been captured; n is the square of the average; and s is the standard deviation value. Then $$m = \frac{1}{p} \sum_{i=1}^{p} \chi_i$$

$$n = \frac{1}{p} \sum_{i=1}^{p} \chi_i^2$$

$$s^2 = \frac{1}{p-1} \sum_{i=1}^{p} (\chi_i - m)^2$$

Here $X_i$ is the value of the aforesaid monitoring feature associated with waveform number i on cycle p. The average value $M_{k+1}$, the square of the average $N_{k+1}$, and the standard deviation $S_{k+1}$ for the same feature on learning cycle k+1 are updated as follows.

$$M_{k+1} = \frac{kM_k + m}{k+1}$$

$$N_{k+1} = \frac{kN_k + n}{k+1}$$

$$S^2_{k+1} = \frac{1}{(k+1)p - 1} (kpN_k - 2kpM_{k+1}M_k + pn - 2pM_{k+1}m + (k+1)pM^2_{k+1})$$

Here the wave form was picked up p times in each learning mode up to k cycle.

Figure 17:
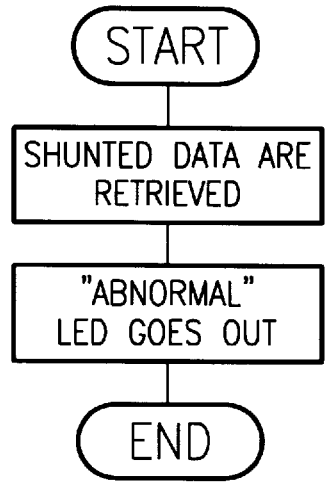
FIG. 17 is a flowchart of the procedure for erasing the learning data.

The display of an abnormal data message allows the user to decide whether it would be worthwhile to update the monitoring method using the current learning data. He can prevent the method from being updated with the current data by pushing "Clear Learning" button 25 (Clear One). As shown in FIG. 17, the previous monitoring data stored in the memory are designated as the effective monitoring data.

Figure 18:
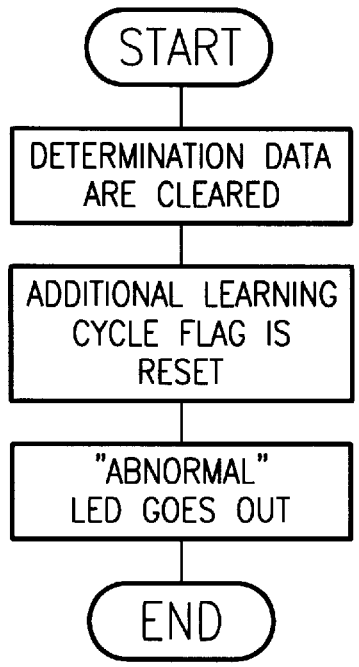
FIG. 18 is a flowchart of the procedure for erasing the learning data.

To erase all the data which have been learned, the user pushes "Initialize Learning" button 26 (Clear All). This completely erases the monitoring method which has been in effect. As is shown in FIG. 18, all the monitoring data are erased, the "Additional Cycle" flag is reset and LED 29 lights up.

The user has the option of pushing either of the aforesaid buttons 25 and 26 regardless of whether LED 29 is lighted. If he does, the data will not be updated with the data learned on the most recent cycle, or all the data learned up until this cycle will be erased.

Figure 19:
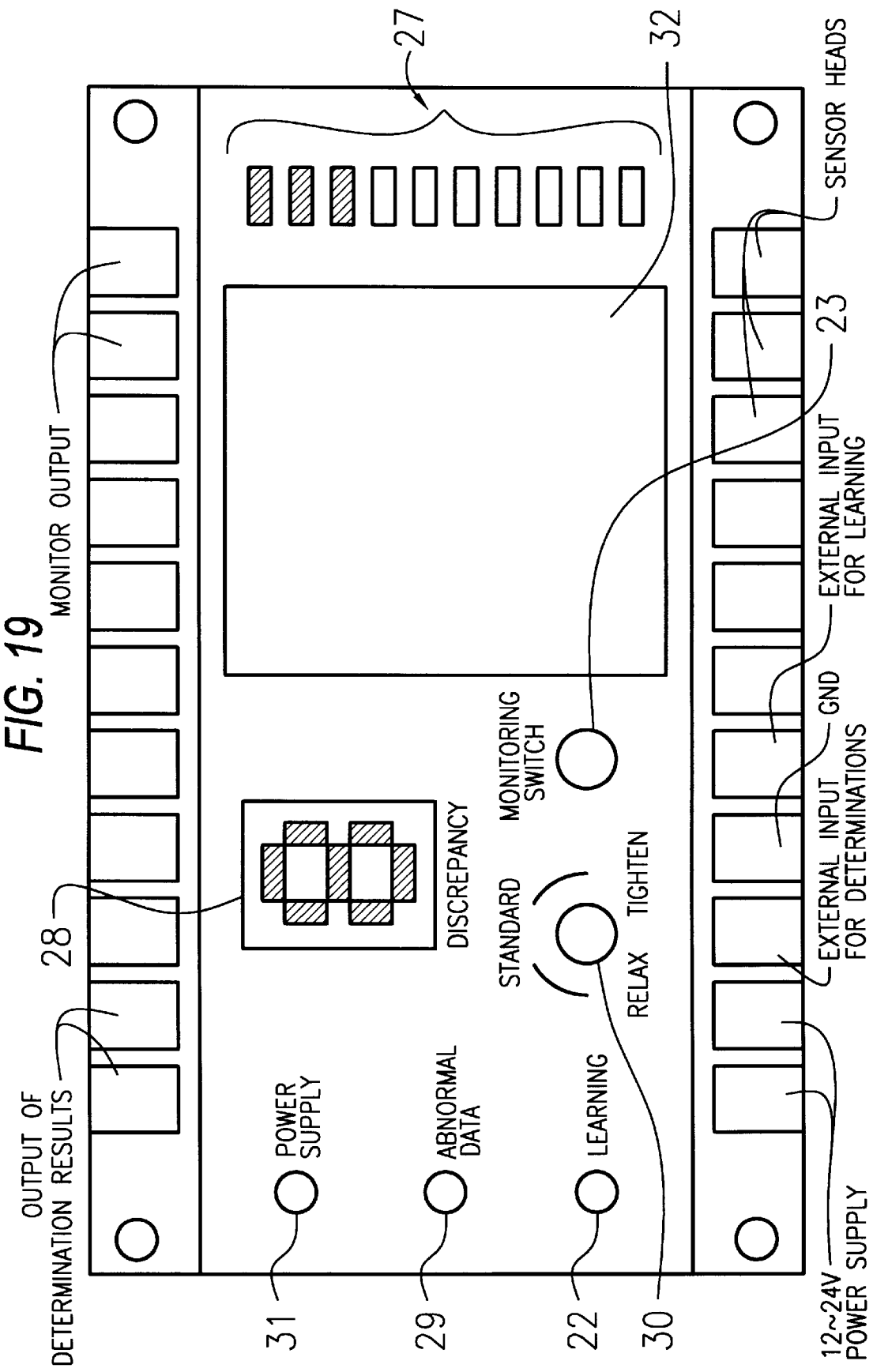
FIG. 19 shows the appearance of the operating panel in FIG. 15 in operating mode.

When learning has been completed, the user sets switch 20 on "Monitoring Mode". If panel 32 is covered at this time, there will be no possibility that a switch will be tripped accidentally in monitoring mode (See FIG. 19).

b) Monitoring Mode

Figure 20:
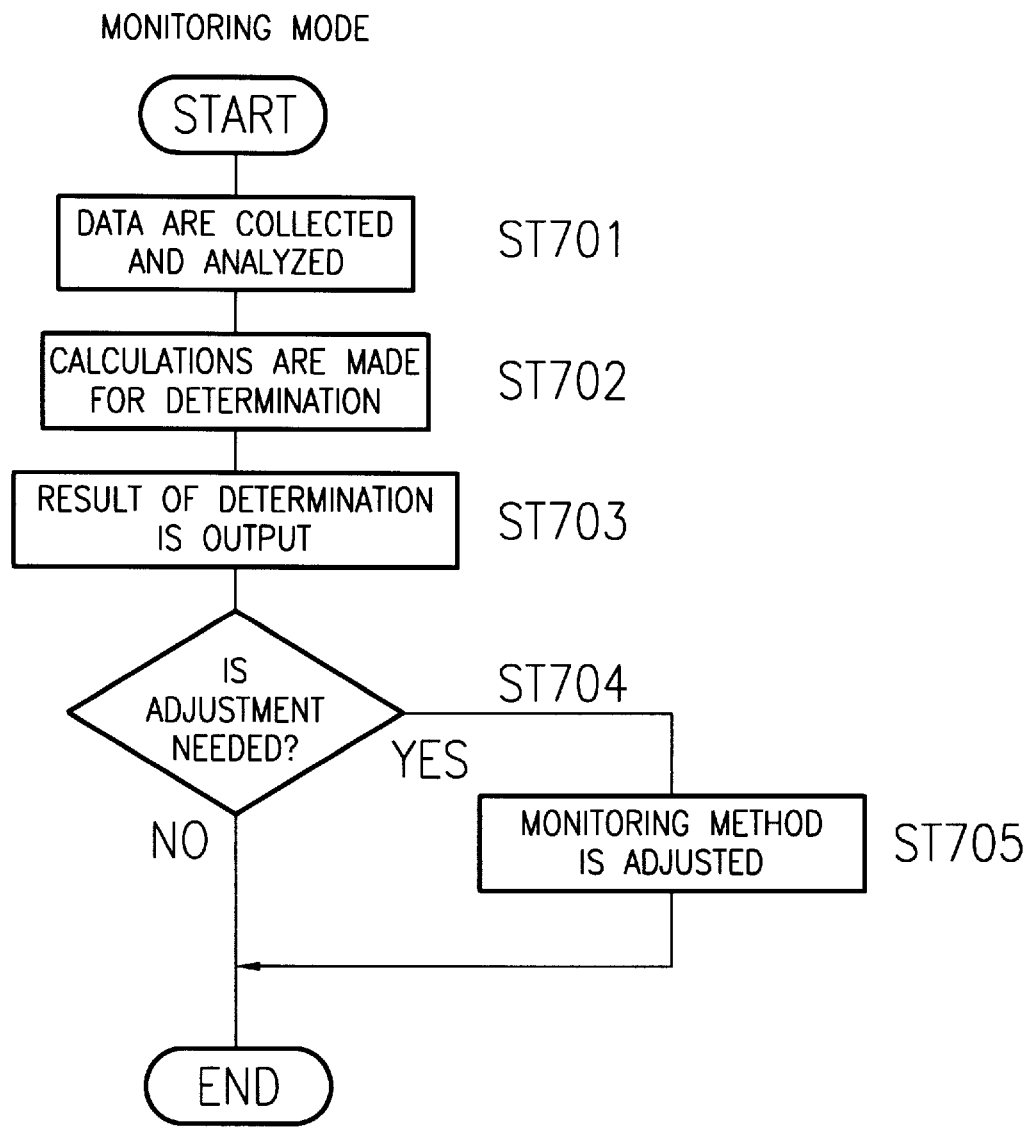
FIG. 20 is a flowchart of the processing executed in operating mode.

To inspect a device to be monitored, the user attaches the sensor to the device to be monitored and initiates monitoring mode by monitoring switch 23. As is shown in FIG. 20, the output of the vibration sensor is captured, monitoring features are extracted and data are collected and analyzed according to the monitoring method selected in learning mode to judge whether the values are in the normal range. The discrepancy with respect to previous values is also obtained (Steps 701 and 702). If the values are abnormal, LED 29 will light up (Step 703). The discrepancy will be shown on display 28 regardless of whether the values are abnormal. The result of the monitoring is also output to an exterior terminal.

The user may wish to adjust the monitoring method in light of the result. If the result is odd, he can use knob 30 to manually adjust the threshold values used in the monitoring (i.e., the normal range). The adjustment applies collectively to every feature selected (Steps 704 and 705). The initial value of the normal range is set at three standard deviations during learning. Turning knob 30 toward "Relax" will expand the normal range (to beyond three standard deviations); turning it toward "Tighten" will constrict the normal range (to less than three standard deviations).

In the embodiments discussed above, learning was executed a number of times with the monitoring data updated after each learning cycle. It would also be possible to determine in advance how many times waveforms will be captured during learning (i.e., how many examples of a product will be inspected during learning). Then waveforms could be captured for the items to be inspected, one after another, on a single learning cycle. In this way a monitoring method can be selected in a single process.

Although it is not represented in the drawings, an additional LED may be provided to indicate that learning has been completed. This LED will be out until a monitoring method selected in learning mode is stored in the monitor. It will light up when learning is executed and a monitoring method is selected. The LED will remain lit until the method which is stored is cleared.

With this configuration, the user can determine when to go to operating mode by looking at the "Learning Completed" LED. If the LED is lit, he knows it is safe to put the monitor in operating mode. No method is stored during initialization or after the method is cleared, so learning must be executed at these times. Since these are the periods when the "Learning Completed" LED will not be lit, the user will understand at a glance that he must switch the monitor to learning mode.

Instead of the aforesaid "Learning Completed" LED, digital output (electrical output via a signal line) could be used which would be off when no monitoring method was stored in the memory and on when one was stored. Another alternative would be an LCD or other display on the monitor to show a message indicating whether a monitoring method was stored.

The "Learning Completed" LED need not be dedicated to this purpose. An existing LED, for example the LED which indicates that learning is in progress, could also be used for this task. An LED could be used which was capable of emitting two colors of light. One color (say, red) could light up to indicate that learning was in progress, and the other (say, green) could light up to indicate that learning had been completed. If no monitoring method was stored in the memory, the LED would not be lit. If a single color were used, it could (for example) flash to indicate that learning was in progress, light constantly to indicate that learning was completed, and be off to indicate that no method was stored.

Figure 21:
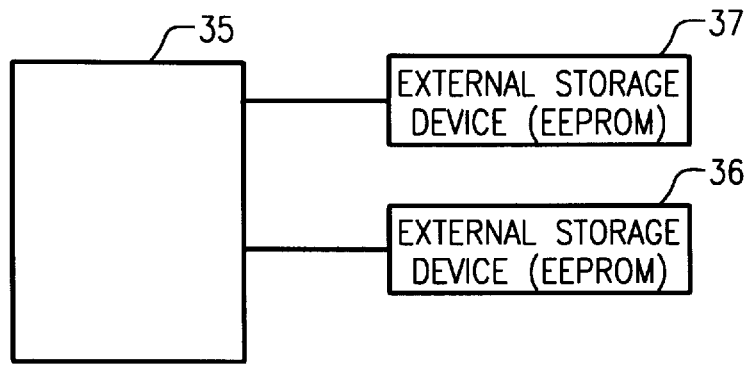
FIG. 21 is an example of how the vibration monitor of this invention might be used.
Figure 22:
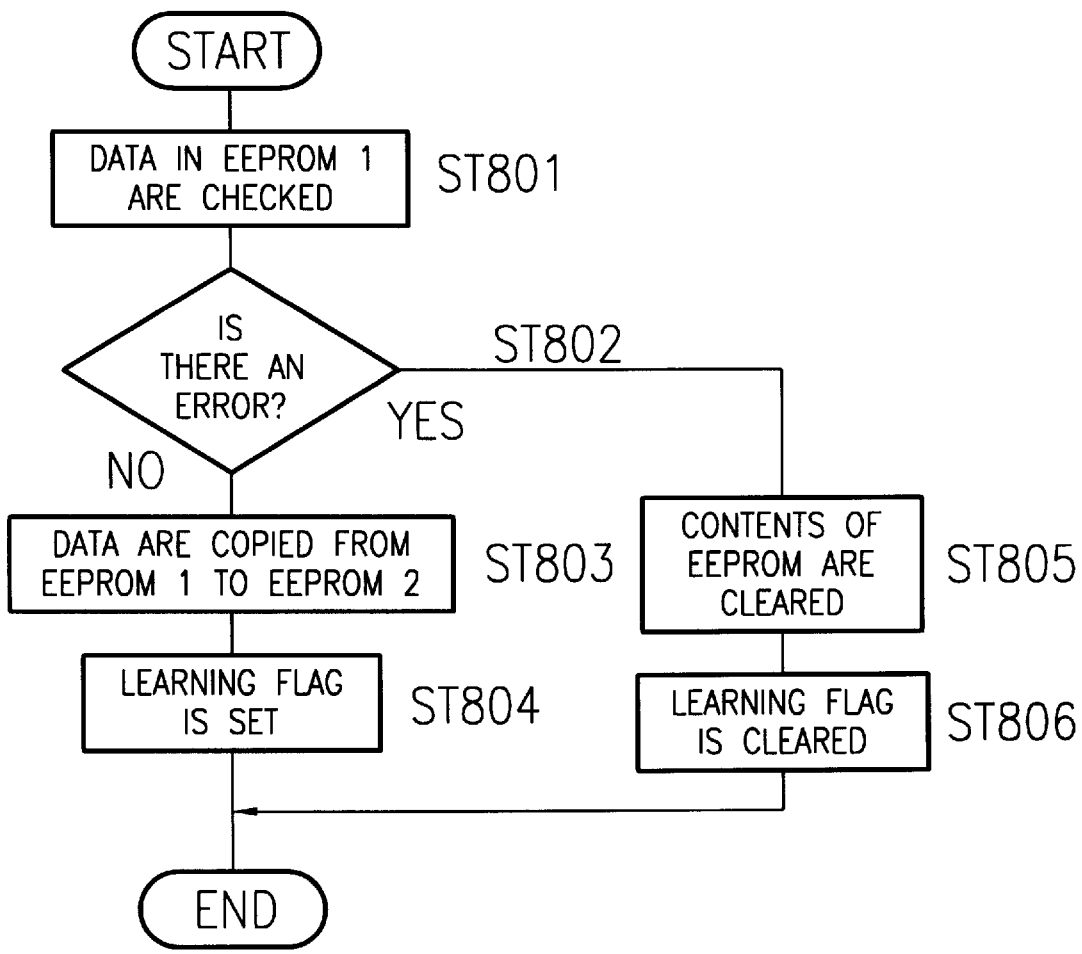
FIG. 22 is an example of how the vibration monitor of this invention might be used.

FIGS. 21 and 22 show an example of how the vibration monitor of this invention might be used. External storage devices 36 and 37, each of which has an EEPROM, are connected to vibration monitor 35. Storage devices 36 and 37 are removable. After they are removed they can be connected to another vibration monitor.

Specifically, learning is executed in the first vibration monitor 35, and a monitoring algorithm is generated. The algorithm which is generated and the other data are written into external storage devices 36 and 37. When the power supply has been disconnected, one of the external storage devices is removed and connected to another vibration monitor to which the data are to be copied. In this way two external storage devices, 36 and 37, are connected to the second vibration monitor. Device 36 contains the original data, consisting of the monitoring algorithm and the other learning data; device 37 has no data stored in it.

When the power supply is started up in this state, the procedure illustrated in FIG. 22 is invoked. First, the content of each external storage device is checked for errors by finding its check sum (Step 801). If no errors are found, the contents of external storage device 36 (the original data) are copied to storage device 37. The learning flag is set, and the monitor goes into its "learning completed" state (Steps 802 through 804). If an error is found, the contents of both storage devices are cleared.

This operation allows the user to reproduce the data associated with the monitoring method. In some cases when a product is being inspected, the same evaluation standard is used on more than one line. If data obtained by learning using one vibration monitor are reproduced and used by another monitor, a single learning cycle will suffice. The data need not be reproduced using a vibration monitor; they could also be reproduced using a separate reproduction device.

As discussed above, the vibration monitor of this invention and the device which determines the conditions used by the monitor may be used on inspection lines to inspect a variety of products. This monitor does not require any skill on the part of the user, and it is simple to change settings when a different product is to be inspected. A vibration monitor with the same specifications can be used to monitor a variety of devices. For the manufacturer, this simplifies the production process. For the user, it simplifies installation and replacement. The same effect is achieved when the monitor is used to inspect a single product on an inspection line.

With the vibration monitor of this invention, as has been discussed, the waveform representing normal vibration is input in learning mode and analyzed with respect to a number of sampling features. The results of this analysis are used to select which features to use in operating mode as monitoring features. The question of which features and how many features will most readily yield a distinction between normal and abnormal vibration is decided in learning mode according to what sort of device is to be monitored. Thus only a small number of monitoring features will need to be analyzed in operating mode.

As a result, the monitoring of normal vs. abnormal vibration can be correctly made using appropriate monitoring features and algorithms which are selected automatically. The monitor can be used with a variety of devices with different vibration characteristics. Since the number of monitoring features used in operating mode is kept to a minimum, the processing can be executed at high speed.

What is claimed is:

1. A vibration monitor to monitor an object, comprising:
   a vibration detection unit to detect vibration of said object with a vibration sensor and output a detection waveform of said vibration;
   a computer unit to process said detection waveform and determine if said vibration of said object is normal or abnormal;
   wherein said computer unit operates in a learning mode to automatically generate a monitoring algorithm based on said detection waveform in a normal condition, said monitoring algorithm is defined by a predetermined number of monitoring features selected from a predetermined number of sampling features in said detection waveform, and said monitoring features evince statistically slight change; and
   wherein said computer unit operates in a monitoring mode to monitor said detection waveform according to said monitoring algorithm.

2. A vibration monitor according to claim 1, wherein said sampling features are maximum value, minimum value, peak-to-peak value, number of times a high-level threshold value is exceeded, number of times a low-level threshold value is exceeded, time period during which said high-level threshold value is exceeded, time period during which said low-level threshold value is exceeded, and number of times a local minimum is generated.

3. A vibration monitor according to claim 1, wherein said computer unit enters in said monitoring mode automatically after said learning mode is completed.

4. A vibration monitor according to claim 1, further comprising a manual input unit to place said computer unit in said monitoring mode after said learning mode.

5. A vibration monitor according to claim 1, further comprising an output unit to indicate that said computer unit is in said learning mode.

6. A vibration monitor according to claim 5, wherein said output unit indicates that said learning mode is completed.

7. A vibration monitor according to claim 5, wherein said computer unit enters said monitoring mode automatically after said learning mode is completed, and said output unit indicates that said computer unit is in said monitoring mode.

8. A vibration monitor according to claim 1, further comprising a manual input unit to manually select a number of said monitoring features from a plurality of said sampling features stored in a memory unit.

9. A vibration monitor according to claim 1, further comprising a manual input unit to manually define said monitoring algorithm.

10. A vibration monitor according to claim 9, wherein said monitoring algorithm is defined by a prior monitoring algorithm manually selected from a plurality of monitoring algorithms previously generated in a plurality of learning modes and stored in a memory unit.

11. A vibration monitor according to claim 10, further comprising an output unit to display output data, wherein said output data indicates a discrepancy between a current monitoring algorithm and a previous monitoring algorithm.

12. A vibration monitor according to claim 11, wherein said discrepancy is a value of monitoring features calculated by said current and previous monitoring algorithms.

13. A vibration monitor according to claim 11, wherein said output unit is a digital indicator to indicate said discrepancy.

14. A vibration monitor according to claim 11, wherein said output unit is a lamp indicator to indicate said discrepancy when said discrepancy is outside a predetermined normal range.

15. A vibration monitor according to claim 9, wherein said monitoring algorithm is defined by a last monitoring algorithm generated in a last learning mode and stored in a memory unit.

16. A vibration monitor according to claim 9, wherein said monitoring algorithm is manually defined by resetting a threshold applying to said detection waveform, and replacing said monitoring feature with a sampling feature obtained after said threshold was reset.

17. A vibration monitor according to claim 16, wherein a plurality of said monitoring features are changed by resetting at least two of said thresholds.

18. A vibration monitor according to claim 1, wherein said vibration detection unit detects a plurality of detection waveforms, and said computer unit generates said monitoring algorithm based on said plurality of detection waveforms.

19. A vibration monitor according to claim 1, further comprising an output unit to display output data, wherein said output data indicates a discrepancy of said monitoring feature values in said learning mode and said monitoring mode calculated by said monitoring algorithm.

20. A vibration monitor according to claim 19, wherein said output unit is a digital indicator to indicate said discrepancy.

21. A vibration monitor according to claim 19, wherein said output unit is a lamp indicator to indicate said discrepancy when said discrepancy is outside a predetermined normal range.

22. A vibration monitor according to claim 1, further comprising an output unit to indicate if said computer unit already contains said monitoring algorithm.

23. A vibration monitor according to claim 1, further comprising an output unit to indicate said monitoring features defining said monitoring algorithm.

24. A vibration monitor according to claim 1, further comprising a filter to separate said detection waveform into a number of frequency bands which are separately processed by said computer unit.

25. A vibration monitor according to claim 1, wherein said computer unit has a gain adjuster to adjust an output level of said detection waveform during said learning mode.

26. A vibration monitor according to claim 1, further comprising a manual input unit to input a parameter to modify said monitoring algorithm.

27. A vibration monitor according to claim 1, wherein said computer unit automatically generates said monitoring algorithm using fuzzy inference.

28. A vibration monitoring method to monitor an object, comprising the steps of:

setting a vibration monitor in a learning mode to learn a normal vibration of an object in normal condition and automatically generating a monitoring algorithm;

setting said vibration monitor in a monitoring mode to monitor said object according said monitoring algorithm;

wherein said monitoring algorithm is defined by a predetermined number of monitoring features selected from a predetermined number of sampling features in a detection waveform, and said monitoring features evince statistically slight change.

* * * * *